(12) United States Patent
Ishida

(10) Patent No.: US 7,496,281 B2
(45) Date of Patent: Feb. 24, 2009

(54) SIGNAL RECORDING APPARATUS AND METHOD AND SIGNAL REPRODUCTION APPARATUS AND METHOD

(75) Inventor: Hideo Ishida, Hyogo (JP)

(73) Assignee: Panasonic Corporation, Osaka (JP)

(*) Notice: Subject to any disclaimer, the term of this patent is extended or adjusted under 35 U.S.C. 154(b) by 997 days.

(21) Appl. No.: 10/885,702

(22) Filed: Jul. 8, 2004

(65) Prior Publication Data

US 2005/0008336 A1    Jan. 13, 2005

(30) Foreign Application Priority Data

Jul. 8, 2003   (JP)   ............... 2003-272082

(51) Int. Cl.
*H04N 7/26* (2006.01)

(52) U.S. Cl. ........................ 386/109; 386/46

(58) Field of Classification Search ............... 348/631; 369/59.13; 370/352; 375/240.01; 386/1, 386/33, 46, 83, 92, 95, 109–112, 125–126; 704/270; 710/22

See application file for complete search history.

(56) References Cited

U.S. PATENT DOCUMENTS

| | | | |
|---|---|---|---|
| 5,950,164 A | | 9/1999 | Takahashi |
| 6,115,341 A | * | 9/2000 | Hirai ................... 369/59.13 |
| 6,718,121 B1 | * | 4/2004 | Shikunami .............. 386/109 |
| 7,170,936 B2 | * | 1/2007 | McVeigh et al. ....... 375/240.01 |
| 7,209,639 B2 | * | 4/2007 | Azuma ................... 386/80 |
| 2003/0091336 A1 | | 5/2003 | Gobert |
| 2003/0099460 A1 | | 5/2003 | Imada et al. |
| 2003/0170008 A1 | | 9/2003 | Ohiro et al. |

FOREIGN PATENT DOCUMENTS

| | | |
|---|---|---|
| EP | 0 802 682 A1 | 10/1997 |
| JP | 09-284715 | 10/1997 |

(Continued)

OTHER PUBLICATIONS

Uehara, M. et al., "Transmission Scheme for the Terrestrial ISDB System", IEEE Transactions on Consumer Electronics, vol. 45, No. 1, Feb. 1999, pp. 101-106, (XP-000888361).

(Continued)

*Primary Examiner*—Thai Tran
*Assistant Examiner*—Marc Dazenski
(74) *Attorney, Agent, or Firm*—McDermott Will & Emery LLP

(57) ABSTRACT

A free space detection section detects a free space of a recording medium. A recording capacity calculation section calculates a recording capacity necessary for recording a program in the form of a first encoded signal on the recording medium. A signal control section for comparing the free space detected by the free space detection section and the recording capacity calculated by the recording capacity calculation section. A signal selection section selects at least one of the first encoded signal and a second encoded signal according to a result of the comparison by the signal control section. A recording section records the encoded signal selected by the signal selection section on the recording medium. The first encoded signal is obtained by compressively encoding the program at a first compression ratio. The second encoded signal is obtained by compressively encoding the program at a second compression ratio which is higher than the first compression ratio.

30 Claims, 33 Drawing Sheets

FOREIGN PATENT DOCUMENTS

| | | |
|---|---|---|
| JP | 9-284715 | 10/1997 |
| JP | 10-214456 | 8/1998 |
| JP | 2000-209553 A | 7/2000 |
| JP | 2000-322786 | 11/2000 |
| JP | 2003-153151 | 5/2003 |

OTHER PUBLICATIONS

Japanese Notice of Reasons for Rejection, w/ and English translation thereof, issued in Patent Application No. JP 2003-272082 dated on Jul. 29, 2008.

* cited by examiner

FIG. 3
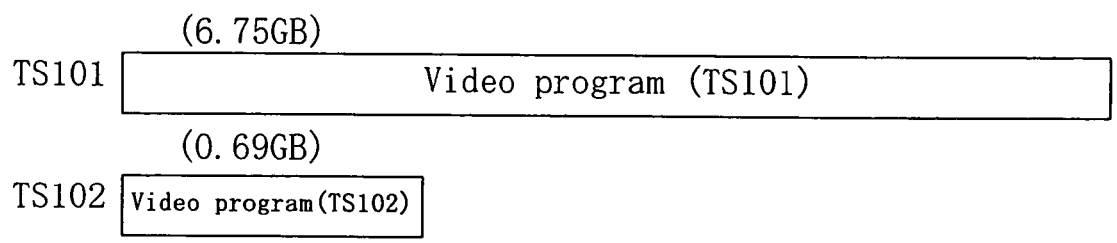
※Free space is smaller than recording capacity
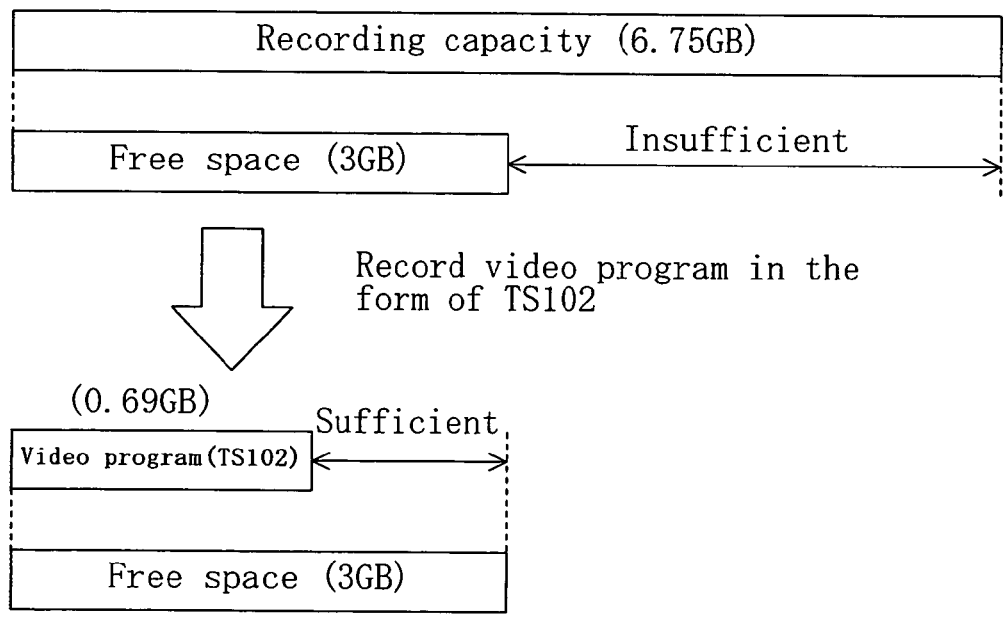

FIG. 5

| | Preselected time | Channel | Priority |
|---|---|---|---|
| B101 | 7:00-8:00 | 2Ch | High quality |
| B102 | 13:00-14:00 | 4Ch | Middle quality |
| B103 | 19:00-20:00 | 6Ch | Low quality |

FIG. 7
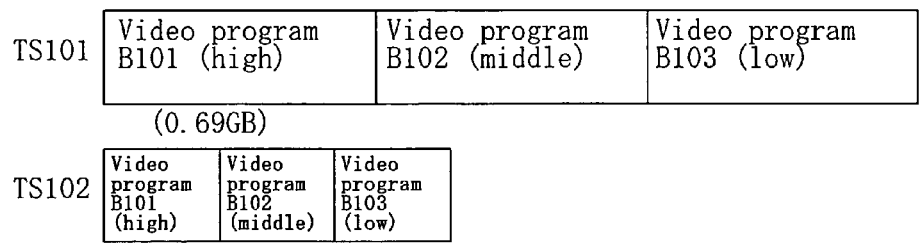
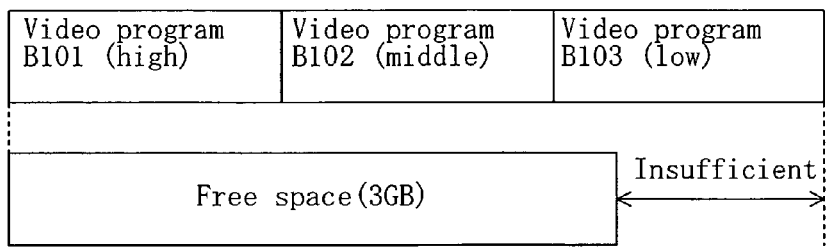
Record video program in the form of:
TS101 when priority is higher than "middle quality"
TS102 when priority is equal to or lower than "middle quality"
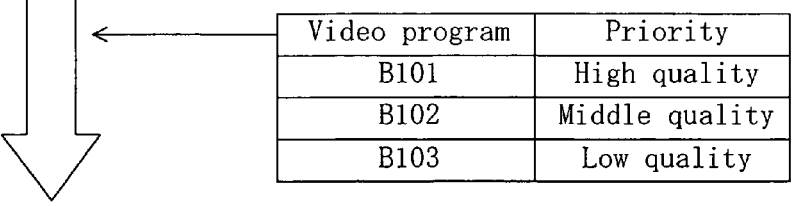
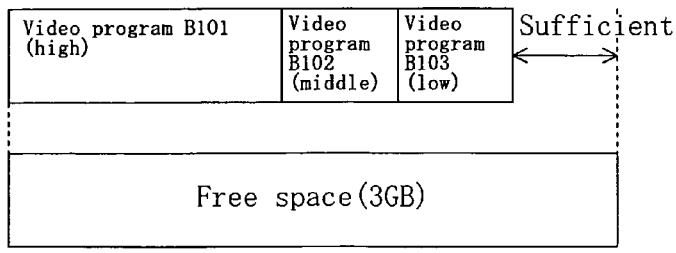

FIG. 28

$$(\text{Total broadcast duration of video program}) \times 3600 \times \frac{\begin{pmatrix} \text{Average encoding bit rate} \\ \text{for stationary receivers} \end{pmatrix}}{8} \quad \cdots (\text{Expression 1})$$

$$= 3 \times 3600 \times \frac{5 \times 10^6}{8}$$

$$= 6.75 [\text{GB}]$$

$$(\text{Total broadcast duration of video program}) \times 3600 \times \frac{\begin{pmatrix} \text{Average encoding bit rate} \\ \text{for mobile receivers} \end{pmatrix}}{8} \quad \cdots (\text{Expression 2})$$

$$= 3 \times 3600 \times \frac{512 \times 10^3}{8}$$

$$= 0.69 [\text{GB}]$$

FIG. 29

$$1 \times 3600 \times \dfrac{5 \times 10^6}{8} + 2 \times 3600 \times \dfrac{512 \times 10^3}{8} \quad \begin{pmatrix} \text{Average} \\ \text{encoding bit} \\ \text{rate for} \\ \text{stationary} \\ \text{receivers} \end{pmatrix} \times 3600 \times \begin{pmatrix} \text{Total broadcast} \\ \text{duration of video} \\ \text{program having} \\ \text{priority higher} \\ \text{than priority} \\ \text{threshold} \end{pmatrix} + \begin{pmatrix} \text{Total broadcast} \\ \text{duration of video} \\ \text{program having} \\ \text{priority equal to} \\ \text{or lower than} \\ \text{priority} \\ \text{threshold} \end{pmatrix} \times 3600 \times \dfrac{\begin{pmatrix} \text{Average} \\ \text{encoding bit} \\ \text{rate for mobile} \\ \text{receivers} \end{pmatrix}}{8} \quad \cdots \text{(Expression 3)}$$

$$= 2.71 \,[\text{GB}]$$

$$2 \times 3600 \times \dfrac{5 \times 10^6}{8} + 1 \times 3600 \times \dfrac{512 \times 10^3}{8} \quad \cdots \text{(Expression 4)}$$

$$= 4.73 \,[\text{GB}]$$

FIG. 30

$$\text{(Broadcast duration from time t1 to time t4)} \times 3600 \times \dfrac{5 \times 10^6}{8} \cdot \dfrac{\begin{pmatrix} \text{Average encoding bit rate for} \\ \text{stationary receivers at time t1} \end{pmatrix}}{8} \quad \cdots \text{(Expression 5)}$$

$$= 3 \times 3600 \times \dfrac{5 \times 10^6}{8}$$

$$= 6.75 \text{[GB]}$$

$$\text{(Broadcast duration from time t2 to time t4)} \times 3600 \times \dfrac{\begin{pmatrix} \text{Average encoding bit} \\ \text{rate for stationary} \\ \text{receivers at time t2} \end{pmatrix}}{8} \quad \cdots \text{(Expression 6)}$$

$$= 2 \times 3600 \times \dfrac{5 \times 10^6}{8}$$

$$= 4.73 \text{[GB]}$$

$$\text{(Broadcast duration from time t3 to time t4)} \times 3600 \times \dfrac{\begin{pmatrix} \text{Average encoding bit rate for} \\ \text{stationary receivers at time t3} \end{pmatrix}}{8} \quad \cdots \text{((Expression 7)}$$

$$= 2 \times 3600 \times \dfrac{20 \times 10^6}{8}$$

$$= 9 \text{[GB]}$$

| Recording time | Encoding method |
|---|---|
| t0~t1 | MPEG2 |
| t1~T | H. 264 | ial recording device
and signal recording method for recording video/audio data
on a recording medium. More specifically, the present invention relates to a device and method for selecting an appropriate encoded signal from among the signals encoded at different compression ratios and recording the selected encoded signal on a recording medium.

2. Description of the Related Art

Examples of conventional devices for recording/reproducing video/audio signals include a DVD recorder, a hard disk recorder, etc., which perform MPEG (Motion Picture Experts Group) compression and encoding on video/audio signals and record the compressed and encoded signals on a recording medium.

Japanese Unexamined Patent Publication No. 9-284715 (Document 1) discloses an apparatus for encoding and recording/reproducing video data. In this apparatus, if the free space of a recording medium is insufficient for recording a video program, the compression ratio for compressively encoding the video signal is increased to reduce the size of the encoded data, whereby the entirety of the video program is recorded in the medium.

FIG. 26 is a block diagram showing a structure of a conventional recording/reproducing apparatus. This apparatus includes video signal input means 10, compressive encoding means 20, recording means 30, a recording medium 40, free space detection means 50, recording time designation means 60 and free space deficiency calculation means 70.

Now, consider a case where the recording/reproducing apparatus shown in FIG. 26 records a video program. In this apparatus, if the free space of a recording medium is insufficient, the compression ratio at which the compressive encoding means 20 compressively encodes a video signal is changed according to the deficiency of the free space which is calculated by the free space deficiency calculation means 70 based on the free space of the recording medium detected by the free space detection means 50 and the recording time designated by the recording time designation means 60, whereby the entirety of the video program is recorded.

The services of the BS and CS digital broadcast programs have already been started, and the services of digital terrestrial broadcasts have been started in the year-end season of 2003.

Now, consider the case of recording a video program received through a digital broadcast system. In the digital broadcast system, the video program is MPEG-compressed and encoded before it is broadcast.

Thus, in a conventional recording/reproduction apparatus, if the free space of a recording medium is insufficient, it is necessary to once decode a MPEG-compressed video program and then again compressively encode the decoded video program according to the deficiency of the free space.

FIG. 27 is a block diagram showing a structure of a conventional recording/reproduction apparatus wherein an MPEG-compressed encoded video program of a digital broadcast is recorded. This apparatus includes decoding means 80 in addition to the components of the recording/reproduction apparatus of FIG. 26. After the decoding means 80 has once decoded the video program of the digital broadcast, the compressive encoding means 20 changes the compression ratio used when the compressive encoding means 20 compressively encodes the video signal according to the deficiency of the free space calculated by the free space deficiency calculation means 70. That is, the free space deficiency calculation means 70 and the decoding means 80 are necessary for recording a video program of a digital broadcast in a recording medium whose free space is insufficient.

SUMMARY OF THE INVENTION

On the other hand, the analog terrestrial broadcast services are to be ceased at the end of 2010. If only with digital broadcasts, the recording/reproduction apparatus only need to record a video program in a recording medium as it is and does not need to incorporate means for compressively encoding the video program.

Thus, it is necessary to incorporate encoding means for changing the compression ratio when the recording capacity of the recording medium is insufficient. Accordingly, the cost of such a recording/reproduction apparatus increases.

Although the decoding means 80 is necessary for viewing video programs, the decoding means 80 is also necessary for changing the compression ratio when the recording capacity is insufficient. Thus, two units of the decoding means 80 are necessary for viewing a video program while recording another video program. Accordingly, the cost of such a recording/reproduction apparatus increases.

An objective of the present invention is to provide a signal recording apparatus at a reduced cost wherein a desired program is recorded without compressive encoding means when the recording capacity is insufficient, and reproduction of a program along with recording of another program is achieved without the necessity of using two decoding means.

According to one aspect of the present invention, a signal recording apparatus records an encoded video signal, an encoded audio signal, or an encoded data signal on a recording medium. The apparatus comprises a free space detection section, a recording capacity calculation section, a signal control section, a signal selection section and a recording section. The free space detection section detects a free space of the recording medium. The recording capacity calculation section calculates a recording capacity necessary for recording a program in the form of a first encoded signal on the recording medium. The signal control section compares the free space detected by the free space detection section and the recording capacity calculated by the recording capacity calculation section. The signal selection section selects at least one of the first encoded signal and a second encoded signal according to a result of the comparison by the signal control section. The recording section records the encoded signal selected by the signal selection section on the recording medium. The first encoded signal is obtained by compressively encoding the program at a first compression ratio. The second encoded signal is obtained by compressively encoding the program at a second compression ratio which is higher than the first compression ratio.

In the above signal recording apparatus, the signal control section determines whether or not the free space is equal to or larger than the recording capacity. If the signal control section determines that the free space is equal to or larger than the recording capacity, the signal selection section selects the first encoded signal. On the other hand, if the signal control section determines that the free space is smaller than the recording capacity, the signal selection section selects the second encoded signal. Thus, when the free space is equal to or larger than the recording capacity, the recording section records the program in the form of the first encoded signal on the recording medium. When the free space is smaller than the recording capacity, the recording section records the program in the form of the second encoded signal on the recording medium. In this way, when the free space is smaller than the recording capacity in the above apparatus, the program is recorded on the recording medium in the form of the second encoded signal whose compression ratio is higher than that of the first encoded signal. As a result, all the programs are recorded on the recording medium even when the free space is insufficient. Further, it is not necessary to provide decoding means and encoding means which are required in a conventional apparatus. Accordingly, a signal recording apparatus of a low cost is provided.

Preferably, the signal recording apparatus further comprises a signal separation section. The signal separation section separates the first encoded signal and the second encoded signal from a multiplex signal including the first encoded signal and the second encoded signal. The signal selection section selects at least one of the first encoded signal and the second encoded signal separated by the signal separation section according to the result of the comparison by the signal control section.

Preferably, the signal selection section extracts at least one of the first encoded signal and the second encoded signal from a multiplex signal including the first encoded signal and the second encoded signal. The recording section records the encoded signal extracted by the signal selection section on the recording medium.

Preferably, the first encoded signal is a signal compressively encoded based on MPEG2, and the second encoded signal is a signal compressively encoded based on MPEG4 or H.264.

Preferably, the first encoded signal is a signal directed to stationary receivers which uses 12 segments of a digital terrestrial broadcast, and the second encoded signal is a signal directed to mobile receivers which uses 1 segment of the digital terrestrial broadcast.

Preferably, the recording capacity calculation section calculates a recording capacity necessary for recording a specific program of a given priority in the form of the first encoded signal on the recording medium. The signal selection section selects the first encoded signal for a program whose priority is higher than a predetermined value and selects the second encoded signal for a program whose priority is equal to or lower than the predetermined value according to the result of the comparison by the signal control section.

In the above signal recording apparatus, the signal selection section determines whether or not the free space is equal to or larger than the recording capacity. If the signal selection section determines that the free space is equal to or larger than the recording capacity, the signal selection section selects the first encoded signal. If the signal selection section determines that the free space is smaller than the recording capacity, the signal selection section selects the first encoded signal for a program whose priority is higher than a predetermined value (threshold value) and selects the second encoded signal for a program whose priority is equal to or lower than the predetermined value (threshold value). That is, the apparatus records the program whose priority is higher than the predetermined value (threshold value) in the form of the first encoded signal and records the program whose priority is equal to or lower than the predetermined value (threshold value) in the form of the second encoded signal whose compression ratio is higher than that of the first encoded signal. Furthermore, the program recorded in the form of the first encoded signal has high picture and sound quality as compared with the picture and sound quality of the program recorded in the form of the second encoded signal. With this structure, a high priority program is recorded while its high picture and sound quality is maintained as compared with a low priority program.

Preferably, the signal recording apparatus further comprises a priority setting section. The recording capacity calculation section calculates a recording capacity necessary for recording a program whose priority is higher than the predetermined value in the form of the first encoded signal and a program whose priority is equal to or lower than the predetermined value in the form of the second encoded signal. When the signal control section determines that the free space is equal to or larger than the recording capacity, the signal selection section selects the first encoded signal for the program whose priority is higher than the predetermined value and the second encoded signal for the program whose priority is equal to or lower than the predetermined value. The priority setting section changes the predetermined value when the signal control section determines that the free space is smaller than the recording capacity.

In the above signal recording apparatus, the priority setting section changes the predetermined value (threshold value) such that the free space is equal to or larger than the recording capacity. As a result, a high priority program is recorded while its high picture and sound quality is maintained as compared with a low priority program. Further, a desired program (specific program with a given priority) can be entirely recorded.

Preferably, the signal recording apparatus further comprises an extended time acquisition section. The extended time acquisition section acquires an extended time of the program. The recording capacity calculation section calculates a recording capacity necessary for recording the program in the form of the first encoded signal in consideration of the extended time acquired by the extended time acquisition section.

In the above signal recording apparatus, the recording capacity calculation section calculates the recording capacity using the encoding bit rate of the first encoded signal and the time length (broadcast duration) of a program. The time length (broadcast duration) of the program includes an extended time acquired by the extended time acquisition section. That is, the recording capacity calculation section calculates the recording capacity using the encoding bit rate of the first encoded signal and the broadcast duration including the extended time. With such a structure, the program is entirely recorded even when the program is extended.

Preferably, the signal recording apparatus further comprises a display section. The display section displays which of the first encoded signal and the second encoded signal is selected by the signal selection section for each program.

Preferably, the free space detection section, the recording capacity calculation section and the signal control section operate in parallel with the process by the recording section for recording the encoded signal selected by the signal selection section on the recording medium. The recording capacity calculation section calculates a recording capacity necessary for recording a part of a program to be recoded on the recording medium, which is not yet recorded on the recording medium, in the form of the first encoded signal on the recording medium.

In the above signal recording apparatus, the free space detection section, the recording capacity calculation section and the signal control section dynamically operate. That is, even after the signal selection section has selected an encoded signal, the free space and the recording capacity are compared to select an encoded signal as necessary. With such a structure, the encoded signal is switched to an appropriate encoded signal according to a dynamic change in the free space or recording capacity as necessary.

Preferably, the signal recording apparatus further comprises a commercial detection section. The commercial detection section detects a commercial in the program. The signal selection section selects the first encoded signal or the second encoded signal according to the result of the comparison by the signal control section during a period when the commercial is detected by the commercial detection section.

The picture quality and sound quality of a program to be recorded change at a timing when the encoded signal is switched. In the case where a program is recorded on a recording medium while an encoded signal is switched in the middle of the program, the program is reproduced while the picture quality and sound quality of the program change in the middle of the program. In some cases, video and/or audio is interrupted at a point where the encoded signal is switched.

In the above signal recording apparatus, the signal selection section switches the encoded signal during a commercial part. For example, consider a case where the first encoded signal has been selected by the signal selection section, and then, the signal control section determines that the free space is smaller than the recording capacity. Then, the signal selection section switches the first encoded signal to the second encoded signal during a period when a commercial is detected by the commercial detection section. That is, even when the signal control section determines that the free space is smaller than the recording capacity, the encoded signal is not switched during a period when a commercial is not detected by the commercial detection section. With this structure, a change in the picture quality and/or sound quality and interruption of video and/or audio are prevented during the principal part of the program although such a change or interruption occurs during a commercial part.

Preferably, the signal selection section outputs a currently-unselected encoded signal in addition to a currently-selected encoded signal to the recording section for a predetermined time period according to the result of the comparison by the signal control section and then stops outputting the priorly-selected encoded signal while continuing to output the subsequently-selected encoded signal. The recording section records the encoded signal output from the signal selection section on the recording medium.

In the above signal recording apparatus, the signal selection section outputs both of the encoded signals (first encoded signal and second encoded signal) to the recording section when the encoded signal is switched. Thereafter, the signal selection section outputs only the subsequently-selected encoded signal. For example, consider a case where the first encoded signal has been selected by the signal selection section. When the signal control section determines that the free space is smaller than the recording capacity, the signal selection section outputs the second encoded signal in addition to the first encoded signal for a certain time period. Then, the signal selection section stops outputting the first encoded signal while continuing to output the second encoded signal. That is, both of the encoded signals are output for a certain time period, and then, only the second encoded signal is output. With this structure, a program is recorded on a recording medium without interruption.

Preferably, the signal recording apparatus further comprises a GOP detection section. The GOP detection section detects a leading part of a GOP in a currently-unselected encoded signal. Immediately after the leading part of the GOP has been detected by the GOP detection section, the signal selection section selects an encoded signal in which the leading part of the GOP has been detected according to the result of the comparison by the signal control section.

For example, consider a case where, in the above signal recording apparatus, the first encoded signal has been selected by the signal selection section, and then, the signal control section determines that the free space is smaller than the recording capacity. Then, the signal selection section switches the first encoded signal to the second encoded signal when a leading part of a GOP is detected in the second encoded signal by the GOP detection section. That is, even when the signal control section determines that the free space is smaller than the recording capacity, the signal selection section does not switch the encoded signal to the second encoded signal till a leading part of a GOP is detected in the second encoded signal by the GOP detection section. With this structure, a program is recorded on a recording medium without interruption.

According to another aspect of the present invention, a signal recording method comprises a free space detection step, a recording capacity calculation step, a signal control step, a signal selection step and a recording step. At the free space detection step, a free space of the recording medium is detected. At the recording capacity calculation step, a recording capacity necessary for recording a program in the form of a first encoded signal on the recording medium is calculated. At the signal control step, the free space detected by the free space detection step and the recording capacity calculated by the recording capacity calculation step are compared. At the signal selection step, at least one of the first encoded signal and a second encoded signal is selected according to a result of the comparison at the signal control step. At the recording step, the encoded signal selected by the signal selection step is recorded on the recording medium. The first encoded signal is obtained by compressively encoding the program at a first compression ratio. The second encoded signal is obtained by compressively encoding the program at a second compression ratio which is higher than the first compression ratio.

In the above signal recording method, it is determined at the signal control step whether or not the free space is equal to or larger than the recording capacity. If it is determined at the signal control step that the free space is equal to or larger than the recording capacity, the first encoded signal is selected at the signal selection step. On the other hand, if it is determined at the signal control step that the free space is smaller than the recording capacity, the second encoded signal is selected at the signal selection step. Thus, when the free space is equal to or larger than the recording capacity, the program is recorded in the form of the first encoded signal on the recording medium at the recording step. When the free space is smaller than the recording capacity, the program is recorded in the form of the second encoded signal on the recording medium at the recording step. In this way, when the free space is smaller than the recording capacity in the above method, the program is recorded on the recording medium in the form of the second encoded signal whose compression ratio is higher than that of the first encoded signal. As a result, all the programs are recorded on the recording medium even when the free space is insufficient. Further, it is not necessary to provide decoding means and encoding means which are required in a conventional apparatus. Accordingly, a signal recording method of a low cost is provided.

Preferably, the signal recording method further comprises a signal separation step. At the signal separation step, the first encoded signal and the second encoded signal are separated from a multiplex signal including the first encoded signal and the second encoded signal. At the signal selection step, at least one of the first encoded signal and the second encoded signal separated at the signal separation step is selected according to the result of the comparison at the signal control step.

Preferably, at the signal selection step, at least one of the first encoded signal and the second encoded signal is extracted from a multiplex signal including the first encoded signal and the second encoded signal. At the recording step, the encoded signal extracted at the signal selection step is recorded on the recording medium.

Preferably, the first encoded signal is a signal compressively encoded based on MPEG2, and the second encoded signal is a signal compressively encoded based on MPEG4 or H.264.

Preferably, the first encoded signal is a signal directed to stationary receivers which uses 12 segments of a digital terrestrial broadcast, and the second encoded signal is a signal directed to mobile receivers which uses 1 segment of the digital terrestrial broadcast.

Preferably, at the recording capacity calculation step, a recording capacity necessary for recording a specific program of a given priority in the form of the first encoded signal on the recording medium is calculated. At the signal selection step, the first encoded signal is selected for a program whose priority is higher than a predetermined value according to the result of the comparison at the signal control step, and the second encoded signal is selected for a program whose priority is equal to or lower than the predetermined value according to the result of the comparison at the signal control step.

In the above signal recording method, it is determined at the signal selection step whether or not the free space is equal to or larger than the recording capacity. If it is determined at the signal selection step that the free space is equal to or larger than the recording capacity, the first encoded signal is selected. If it is determined at the signal selection step that the free space is smaller than the recording capacity, the first encoded signal is selected for a program whose priority is higher than a predetermined value (threshold value), and the second encoded signal is selected for a program whose priority is equal to or lower than the predetermined value (threshold value). That is, in the above method, the program whose priority is higher than the predetermined value (threshold value) is recorded in the form of the first encoded signal, and the program whose priority is equal to or lower than the predetermined value (threshold value) is recorded in the form of the second encoded signal whose compression ratio is higher than that of the first encoded signal. Furthermore, the program recorded in the form of the first encoded signal has high picture and sound quality as compared with the picture and sound quality of the program recorded in the form of the second encoded signal. With this structure, a high priority program is recorded while its high picture and sound quality is maintained as compared with a low priority program.

Preferably, the above signal recording method further comprises a priority setting step. At the recording capacity calculation step, a recording capacity necessary for recording a program whose priority is higher than the predetermined value in the form of the first encoded signal and a program whose priority is equal to or lower than the predetermined value in the form of the second encoded signal is calculated. When it is determined at the signal control step that the free space is equal to or larger than the recording capacity, the first encoded signal is selected at the signal selection step for the program whose priority is higher than the predetermined value, and the second encoded signal is selected at the signal selection step for the program whose priority is equal to or lower than the predetermined value. At the priority setting step, the predetermined value is changed when it is determined at the signal control step that the free space is smaller than the recording capacity.

In the above signal recording method, the predetermined value (threshold value) is changed at the priority setting step such that the free space is equal to or larger than the recording capacity. As a result, a high priority program is recorded while its high picture and sound quality is maintained as compared with a low priority program. Further, a desired program (specific program with a given priority) can be entirely recorded.

Preferably, the above signal recording method further comprises an extended time acquisition step. At the extended time acquisition step, an extended time of the program is acquired. At the recording capacity calculation step, a recording capacity necessary for recording the program in the form of the first encoded signal is calculated in consideration of the extended time acquired at the extended time acquisition step.

In the above signal recording method, the recording capacity is calculated at the recording capacity calculation step using the encoding bit rate of the first encoded signal and the time length (broadcast duration) of a program. The time length (broadcast duration) of the program includes an extended time acquired at the extended time acquisition step. That is, the recording capacity calculation section calculates the recording capacity using the encoding bit rate of the first encoded signal and the broadcast duration including the extended time. With such a structure, the program is entirely recorded even when the program is extended.

Preferably, the signal recording method further comprises a display step. The display step displays which of the first encoded signal and the second encoded signal is selected at the signal selection step for each program.

Preferably, the free space detection step, the recording capacity calculation step and the signal control step are performed in parallel with the process performed at the recording step of recording the encoded signal selected at the signal selection step on the recording medium. At the recording capacity calculation step, a recording capacity necessary for recording a part of a program to be recoded on the recording medium, which is not yet recorded on the recording medium, in the form of the first encoded signal on the recording medium is calculated.

In the above signal recording method, the free space detection step, the recording capacity calculation step and the signal control step are dynamically performed. That is, even after an encoded signal has been selected at the signal selection step, the free space and the recording capacity are compared to select an encoded signal as necessary. With such a structure, the encoded signal is switched to an appropriate encoded signal according to a dynamic change in the free space or recording capacity as necessary.

Preferably, the signal recording method further comprises a commercial detection step. The commercial detection step detects a commercial in the program. At the signal selection step, the first encoded signal or the second encoded signal is selected according to the result of the comparison at the signal control step during a period when the commercial is detected at the commercial detection step.

The picture quality and sound quality of a program to be recorded change at a timing when the encoded signal is switched. In the case where a program is recorded on a recording medium while an encoded signal is switched in the middle of the program, the program is reproduced while the picture quality and sound quality of the program change in the middle of the program. In some cases, video and/or audio is interrupted at a point where the encoded signal is switched.

In the above signal recording apparatus, at the signal selection step, the encoded signal is switched during a commercial part. For example, consider a case where the first encoded signal has been selected at the signal selection step, and then, it is determined at the signal control step that the free space is smaller than the recording capacity. Then, at the signal selection step, the first encoded signal is switched to the second encoded signal during a period when a commercial is detected at the commercial detection step. That is, even when it is determined at the signal control step that the free space is smaller than the recording capacity, the encoded signal is not switched during a period when a commercial is not detected at the commercial detection step. With this structure, a change in the picture quality and/or sound quality and interruption of video and/or audio are prevented during the principal part of the program although such a change or interruption occurs during a commercial part.

Preferably, at the signal selection step, a currently-unselected encoded signal is output in addition to a currently-selected encoded signal for a predetermined time period according to the result of the comparison at the signal control step, and then, output of the priorly-selected encoded signal is stopped while output of the subsequently-selected encoded signal is continued. At the recording step, the encoded signal output at the signal selection step is recorded on the recording medium.

In the above signal recording method, at the signal selection step, both of the encoded signals (first encoded signal and second encoded signal) are output when the encoded signal is switched. Thereafter, at the signal selection step, only the subsequently-selected encoded signal is output. For example, consider a case where the first encoded signal has been selected at the signal selection step. When it is determined at the signal control step that the free space is smaller than the recording capacity, the second encoded signal is output at the signal selection step in addition to the first encoded signal for a certain time period. Then, at the signal selection step, output of the first encoded signal is stopped while output of the second encoded signal is continued. That is, both of the encoded signals are output for a certain time period, and then, only the second encoded signal is output. With this structure, a program is recorded on a recording medium without interruption.

Preferably, the above signal recording method further comprises a GOP detection step. At the GOP detection step, a leading part of a GOP is detected in a currently-unselected encoded signal. At the signal selection step, an encoded signal in which the leading part of the GOP has been detected is selected according to the result of the comparison at the signal control step immediately after the leading part of the GOP has been detected at the GOP detection step.

For example, consider a case where, in the above signal recording method, the first encoded signal has been selected at the signal selection step, and then, it is determined at the signal control step that the free space is smaller than the recording capacity. Then, at the signal selection step, the first encoded signal is switched to the second encoded signal when a leading part of a GOP is detected in the second encoded signal at the GOP detection step. That is, even when it is determined at the signal control step that the free space is smaller than the recording capacity, the encoded signal is not switched to the second encoded signal at the signal selection step till a leading part of a GOP included in the second encoded signal is detected at the GOP detection step. With this structure, a program is recorded on a recording medium without interruption.

In a signal recording apparatus of the present invention, when the free space is smaller than the recording capacity, a program is recorded on a recording medium in the form of the second encoded signal whose compression ratio is higher than that of the first encoded signal. As a result, all the programs are recorded on the recording medium even when the free space is insufficient. Further, it is not necessary to provide decoding means and encoding means which are required in a conventional apparatus. Accordingly, a signal recording apparatus of a low cost is provided.

BRIEF DESCRIPTION OF THE DRAWINGS

FIG. 3 shows a specific example wherein a video program is recorded on a recording medium by the video signal recording apparatus shown in FIG. 1.

FIG. 5 is an example of preselected program information.

FIG. 7 shows a specific example wherein a video program is recorded on a recording medium by the video signal recording apparatus shown in FIG. 4.

FIG. 28 illustrates how to calculate the recording capacity (Expressions 1 and 2).

FIG. 29 illustrates how to calculate the recording capacity (Expressions 3 and 4).

FIG. 30 illustrates how to calculate the recording capacity (Expressions 5, 6 and 7).

DESCRIPTION OF THE PREFERRED EMBODIMENTS

Figure 1:
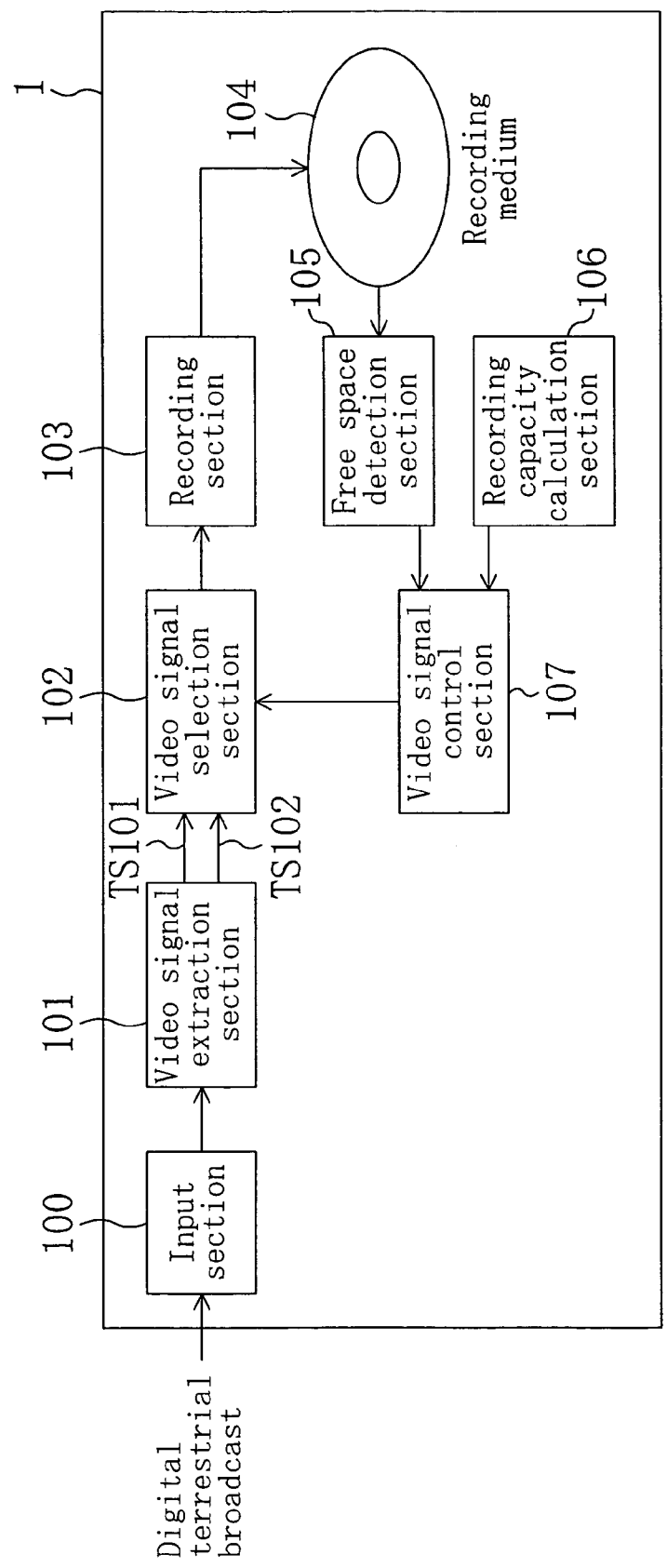
FIG. 1 is a block diagram showing an entire structure of a video signal recording apparatus according to embodiment 1 of the present invention.

Hereinafter, embodiments of the present invention are described in detail with reference to the drawings. Throughout the drawings, the same or equivalent elements are denoted by the same reference numerals, and therefore, descriptions thereof are not repeated.

Embodiment 1

FIG. 1 shows the entire structure of a video signal recording apparatus 1 according to embodiment 1 of the present invention. The video signal recording apparatus 1 includes an input section 100, a video signal extraction section 101, a video signal selection section 102, a recording section 103, a recording medium 104, a free space detection section 105, a recording capacity calculation section 106 and a video signal control section 107. The input section 100 receives a digital terrestrial broadcast and outputs a transport stream to the video signal extraction section 101. The video signal extraction section 101 extracts transport stream TS101 of a broadcast for stationary receivers and transport stream TS102 of a broadcast for mobile receivers from among the transport streams output by the input section 100. The video signal selection section 102 selects transport stream TS101 or transport stream TS102 according to an instruction from the video signal control section 107. The recording section 103 records transport stream TS101 or transport stream TS102 selected by the video signal selection section 102 on the recording medium 104. The free space detection section 105 detects the free space of the recording medium 104. The recording capacity calculation section 106 calculates the recording capacity necessary for recording a desired video program in the form of a transport stream of a broadcast for stationary receivers from the time length (broadcast duration) of the video program and the average encoding bit rate of the broadcast for stationary receivers of the video program. The video signal control section 107 controls the video signal selection section 102 such that if the free space detected by the free space detection section 105 is equal to or larger than the recording capacity calculated by the recording capacity calculation section 106, the video signal selection section 102 selects transport stream TS101 of a broadcast for stationary receivers. If the free space is smaller than the recording capacity, the video signal selection section 102 selects transport stream TS102 of a broadcast for mobile receivers.

Now, the digital terrestrial broadcast is described.

In the digital terrestrial broadcast system, the band of a single channel is divided into 13 segments. Among these segments, 12 segments are used for broadcasting a video signal compressively encoded based on MPEG2 for stationary receivers, such as household installed television sets, or the like. The remaining 1 segment is used for broadcasting a video signal compressively encoded based on MPEG4 or H.264 for mobile receivers, such as cellular mobile phones, or the like. A video program for mobile receivers has a lower resolution and a higher compression ratio, and the recording capacity necessary for recording the video program is small, as compared with a video program for stationary receivers. The encoding bit rate exhibits a substantially constant value in some broadcast systems although it does not exhibit a definitely fixed value. For example, in the case of the digital Hi-Vision broadcast system (HD), the encoding bit rate is twenty and several Mbps. In the case of the digital standard-definition broadcast system (SD), the encoding bit rate is 3 to 5 Mbps.

Figure 2:
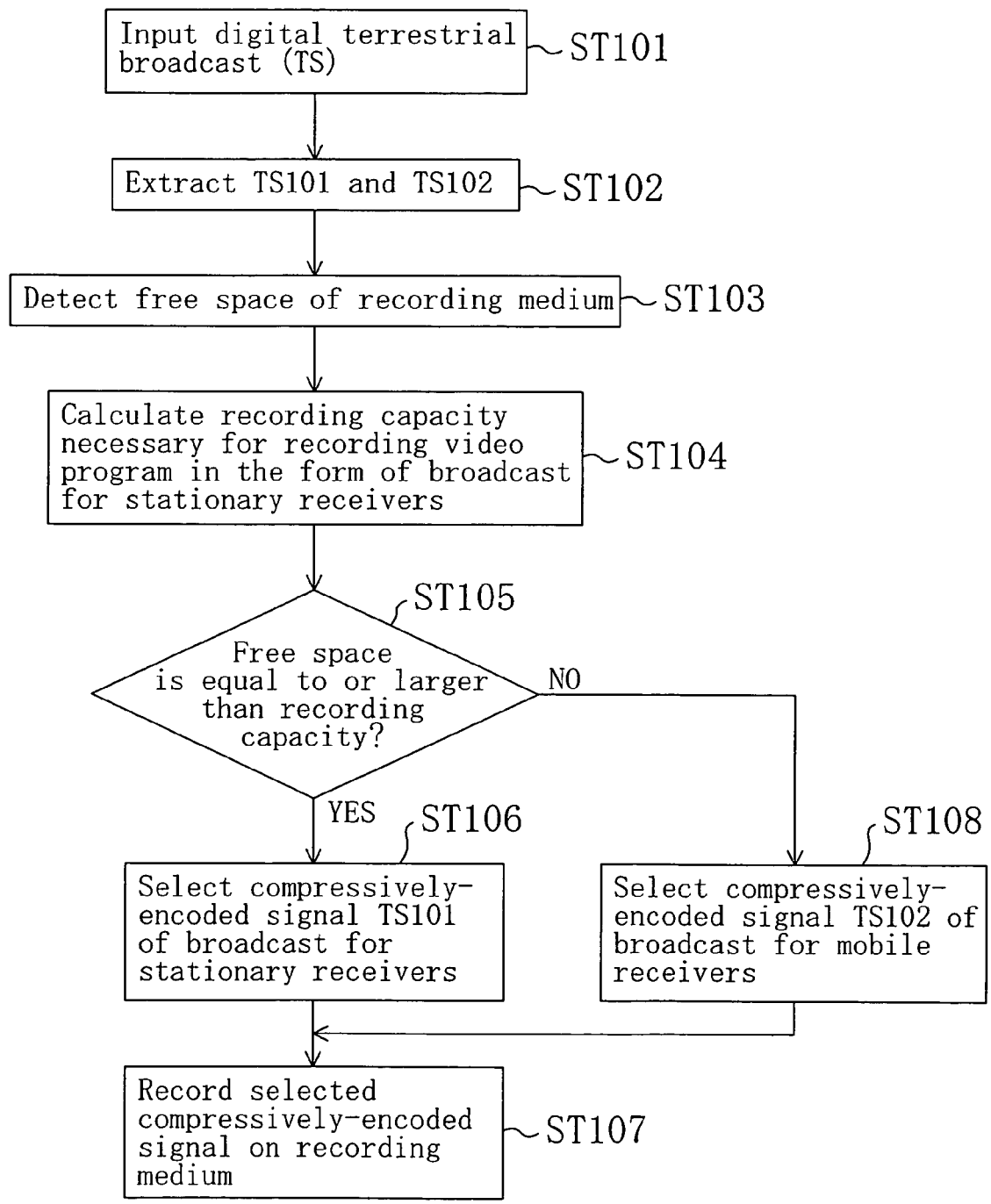
FIG. 2 is a flowchart illustrating an operation of the video signal recording apparatus shown in FIG. 1.

Hereinafter, the operation of the video signal recording apparatus 1 shown in FIG. 1 is described with reference to FIG. 2.

[Step ST101]

At the first step, the input section 100 receives a digital terrestrial broadcast (transport stream) and outputs it to the video signal extraction section 101.

[Step ST102]

The video signal extraction section 101 analyzes SI (Service Information) data included in the transport stream output from the input section 100 to extract transport stream TS101 of a broadcast for stationary receivers and transport stream TS102 of a broadcast for mobile receivers, which include a video program to be recorded.

[Step ST103]

The free space detection section 105 detects the free space of the recording medium 104.

[Step ST104]

The recording capacity calculation section 106 calculates the recording capacity necessary for recording the video program in the form of transport stream TS101 of a broadcast for stationary receivers. Specifically, the recording capacity calculation section 106 calculates the recording capacity necessary for recording a desired video program in the form of transport stream TS101 of a broadcast for stationary receivers from the time length (broadcast duration) of the video program and the average encoding bit rate of the broadcast for stationary receivers of the video program. The time length (broadcast duration) of the video program is obtained from the SI (Service Information) data included in the transport stream. The average encoding bit rate is set in the recording capacity calculation section 106 in advance. The value of the average encoding bit rate is given in consideration of the type of the broadcast system. For example, in the case of the digital standard-definition broadcast system (SD broadcast system), the encoding bit rate is 3 to 5 Mbps. Thus, the value of the average encoding bit rate is set to 5 Mbps.

[Step ST105]

The video signal control section 107 compares the free space detected by the free space detection section 105 and the recording capacity calculated by the recording capacity calculation section 106. If the free space is equal to or larger than the recording capacity, the process proceeds to step ST106. If the free space is smaller than the recording capacity, the process proceeds to step ST108.

[Step ST106]

The video signal selection section 102 selects transport stream TS101 of a program for stationary receivers from among the transport streams extracted by the video signal extraction section 101. Then, the process proceeds to step ST107.

[Step ST107]

The recording section 103 records the transport stream selected by the video signal selection section 102 on the recording medium 104.

[Step ST108]

On the other hand, if it is determined that the free space is smaller than the recording capacity at step ST105, the video signal selection section 102 selects transport stream TS102 of a program for mobile receivers from among the transport streams extracted by the video signal extraction section 101. Then, the process proceeds to step ST107.

Hereinafter, the above process is further described with specific values with reference to FIG. 3.

It is assumed herein that the average bit rate of a video program of a broadcast for stationary receivers is 5 Mbps, the average bit rate of a video program of a broadcast for mobile receivers is 512 Kbps, the broadcast duration of the video program is 3 hours, and the free space of the recording medium 104 is 3 GB.

In this case, in the process of step ST105, the recording capacity necessary for recording the video program in the form of the transport stream of a broadcast for stationary receivers is calculated to be 6.75 GB as shown in Expression 1 of FIG. 28. Thus, the free space is smaller than the recording capacity.

On the other hand, in the process of step ST107, the recording capacity necessary for recording the video program in the form of the transport stream of a broadcast for mobile receivers is calculated to be 0.69 GB as shown in Expression 2 of FIG. 28. Thus, the free space is larger than the recording capacity.

As described above, if the free space is smaller than the recording capacity (i.e., if the free space is insufficient for recording a video program), the video signal selection section selects the video signal of a digital terrestrial broadcast for mobile receivers. Thus, the entirety of the video program can be recorded by recording the video signal of a high compression ratio without using a decoding section and an encoding section. Thus, the cost of the decoding section and encoding section is decreased.

In embodiment 1 of the present invention, the video signal extraction section 101 and the video signal selection section 102 are provided as separate sections. However, the video signal extraction section 101 and the video signal selection section 102 may be integrated. In this case, for example, if the free space is equal to or larger than the recording capacity, the video signal extraction section 101 only extracts the transport stream of a broadcast for stationary receivers. If the free space is smaller than the recording capacity, the video signal extraction section 101 only extracts the transport stream of a broadcast for mobile receivers. The recording section 103 records the transport stream extracted by the video signal extraction section 101.

A plurality of candidate values of the average encoding bit rate may be set in the recording capacity calculation section 106 in advance. That is, the average encoding bit rate may be set for each broadcast system. For example, the average encoding bit rate may be set in advance such that average encoding bit rate B1 for the digital Hi-Vision broadcast system (HD) is 20 Mbps, and average encoding bit rate B2 for the digital standard-definition broadcast system (SD) is 5 Mbps. In this case, the recording capacity calculation section 106 selects an appropriate one from among the average encoding bit rates set in advance according to the broadcast type of the digital terrestrial broadcast and uses the selected average encoding bit rate to calculate the recording capacity.

In the case where a video program of the digital Hi-Vision broadcast system (HD) is recorded for two hours and a video program of the digital standard-definition broadcast system (SD) is recorded for one hours, the recording capacity calculation section 106 may calculate the recording capacity using the average value of average encoding bit rate B1 and average encoding bit rate B2.

Embodiment 2

Figure 4:
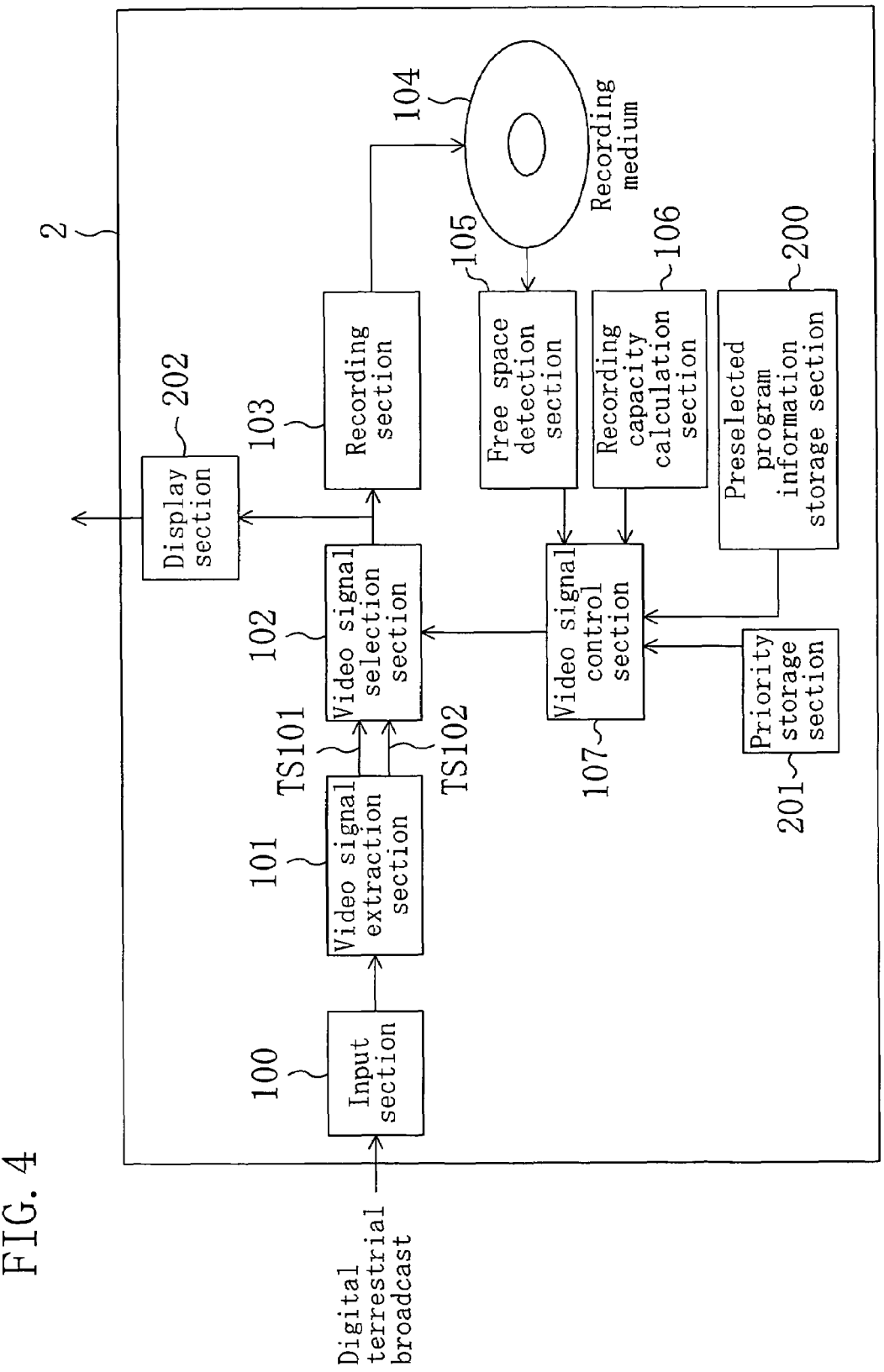
FIG. 4 is a block diagram showing an entire structure of a video signal recording apparatus according to embodiment 2 of the present invention.

FIG. 4 shows the entire structure of a video signal recording apparatus 2 according to embodiment 2 of the present invention. The video signal recording apparatus 2 includes a preselected program information storage section 200, a priority storage section 201 and a display section 202 in addition to the components of the video signal recording apparatus 1 of FIG. 1. The preselected program information storage section 200 stores the program information of a preselected video program to be recorded (channel, preselected time, etc.) and the priority of the video program as shown in FIG. 5. The priority storage section 201 stores a priority threshold value. The display section 202 shows which transport stream has been selected by the video signal selection section 102.

Figure 6:
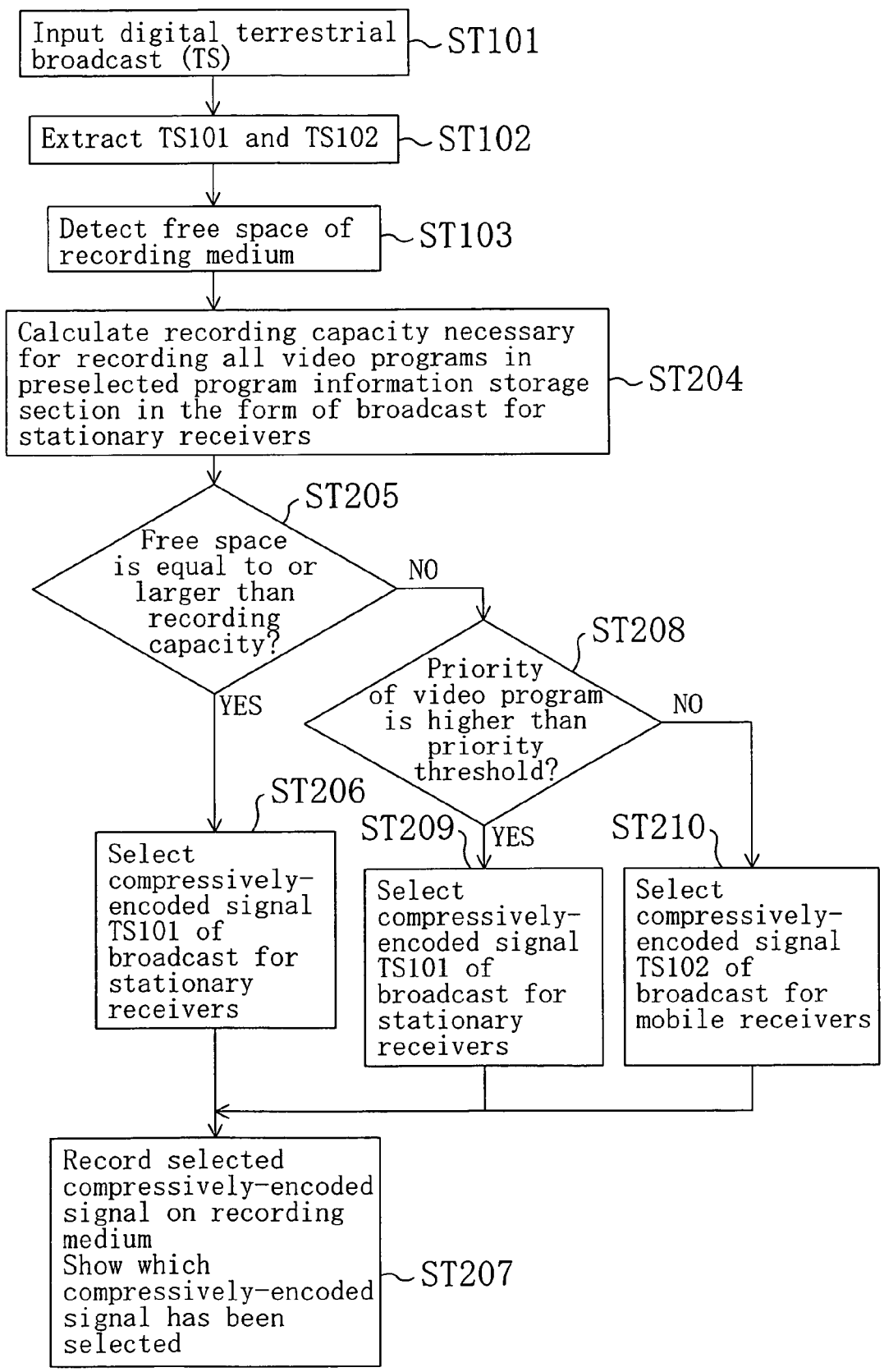
FIG. 6 is a flowchart illustrating an operation of the video signal recording apparatus shown in FIG. 4.

Hereinafter, the operation of the video signal recording apparatus 2 shown in FIG. 4 is described with reference to FIG. 6.

[Steps ST101 to ST103]

First, the processes of steps ST101 to ST103 are performed.

[Step ST204]

The recording capacity calculation section 106 calculates the recording capacity necessary for recording the video programs shown in the preselected program information stored in the preselected program information storage section 200 (see FIG. 5) in the form of transport stream TS101 of a broadcast for stationary receivers. Specifically, the recording capacity calculation section 106 calculates the recording capacity necessary for recording the video programs indicated by the preselected program information in the form of transport stream TS101 of a broadcast for stationary receivers from the sum of the time lengths (broadcast durations) of the video programs and the average encoding bit rate of the broadcast for stationary receivers of the video programs. In the case where the preselected program information shown in FIG. 5 is stored in the preselected program information storage section 200, the time length (broadcast duration) of the video programs is the sum of the broadcast durations of programs B101, B102 and B103, i.e., "3 hours".

[Step ST205]

The video signal control section 107 compares the free space detected by the free space detection section 105 and the recording capacity calculated by the recording capacity calculation section 106. If the free space is equal to or larger than the recording capacity, the process proceeds to step ST206. If the free space is smaller than the recording capacity, the process proceeds to step ST208.

[Step ST206]

The video signal selection section 102 selects transport stream TS101 of a program for stationary receivers from among the transport streams extracted by the video signal extraction section 101. Then, the process proceeds to step ST107.

[Step ST107]

The recording section 103 records the transport stream selected by the video signal selection section 102 on the recording medium 104. The display section 202 shows which transport stream has been selected by the video signal selection section 102.

[Step ST208]

If it is determined at step ST205 that the free space is smaller than the recording capacity, the video signal control section 107 compares the priority of a video program stored in the preselected program information storage section 200 with the priority threshold value stored in the priority storage section 201. If the priority of the video program is higher than the priority threshold value, the process proceeds to step ST209. If the priority of the video program is equal to or lower than the priority threshold value, the process proceeds to step ST210.

[Step ST209]

The video signal selection section 102 selects transport stream TS101 of a broadcast for stationary receivers from among the transport streams extracted by the video signal extraction section 101. That is, the video signal selection section 102 selects transport stream TS101 for a video program whose priority is higher than the priority threshold value. Then, the process proceeds to step ST207.

[Step ST210]

If the priority of the video program is equal to or lower than the priority threshold value at step ST208, the video signal selection section 102 selects transport stream TS102 of a broadcast for mobile receivers from among the transport streams extracted by the video signal extraction section 101. That is, the video signal selection section 102 selects transport stream TS102 for a video program whose priority is equal to or lower than the priority threshold value. Then, the process proceeds to step ST207.

As described above, a video program whose priority is higher than the priority threshold value is recorded on the recording medium 104 in the form of transport stream TS101 of a broadcast for stationary receivers, whereas a video program whose priority is equal to or lower than the priority threshold value is recorded on the recording medium 104 in the form of transport stream TS102 of a broadcast for mobile receivers. For example, in the case where the preselected program information shown in FIG. 5 is stored in the preselected program information storage section 200 and the priority threshold value stored in the priority storage section 201 is "middle quality", program B101 whose priority is "high quality" is recoded on the recording medium 104 in the form of transport stream TS101 while programs B102 and B103 whose priorities are "middle quality" and "low quality", respectively, are recoded on the recording medium 104 in the form of transport stream TS102.

Hereinafter, the above process is further described with specific values with reference to FIG. 7.

It is assumed herein that the preselected program information and the priority shown in FIG. 5 are stored in the preselected program information storage section 200. Since the broadcast duration of each of video programs B101, B102 and B103 is one hour, the total broadcast duration is 3 hours. It is further assumed that the free space of the recording medium 104 is 3 GB, the average bit rate of a video program for stationary receivers is 5 Mbps, the average bit rate of a video program for mobile receivers is 512 Kbps, and the priority threshold value is "middle quality".

In this case, in the process of step ST204, the recording capacity necessary for recording video programs B101, B102 and B103 in the form of transport stream TS101 of a broadcast for stationary receivers is calculated to be 6.75 GB as shown in Expression 1 of FIG. 28. Thus, the free space is smaller than the recording capacity.

In the process of step ST208, the priority of the video program is compared with the priority threshold value.

In the processes of steps ST209 and ST210, the video signal selection section 102 selects transport stream TS101 of a broadcast for stationary receivers in the case of video program B101 whose priority (high quality) is higher than the priority threshold value, whereas the video signal selection section 102 selects transport stream TS102 of a broadcast for mobile receivers in the case of video programs B102 and B103 whose priority (middle quality, low quality) is equal to or lower than the priority threshold value.

In the process of step ST207, the recording section 103 records the video programs on the recording medium 104 in the form of the transport streams selected by the video signal selection section 102. The recording capacity necessary for recording video program B101 whose priority (high quality) is higher than the priority threshold value (middle quality) in the form of transport stream TS101 of a broadcast for stationary receivers and video programs B102 and B103 whose priority (middle quality, low quality) is equal to or lower than the priority threshold value (middle quality) in the form of transport stream TS102 of a broadcast for mobile receivers is calculated to be 2.71 GB as shown in Expression 3 of FIG. 29. Thus, the free space is larger than the recording capacity.

As described above, if the recording capacity is larger than the free space, a video program whose priority is higher than the priority threshold value is recorded in the form of a video signal of a broadcast for stationary receivers, and a video program whose priority is equal to or lower than the priority threshold value is recorded in the form of a video signal of a broadcast for mobile receivers. In this way, a plurality of video programs are recorded without decreasing the image quality of a high priority video program.

In embodiment 2, the image quality is used as the index of the priority. However, numeric numbers may be used instead. Alternatively, it is possible that the genres of programs are associated with values of the priority by user's designation such that sport programs have high priority and news programs have low priority.

Embodiment 3

Figure 8:
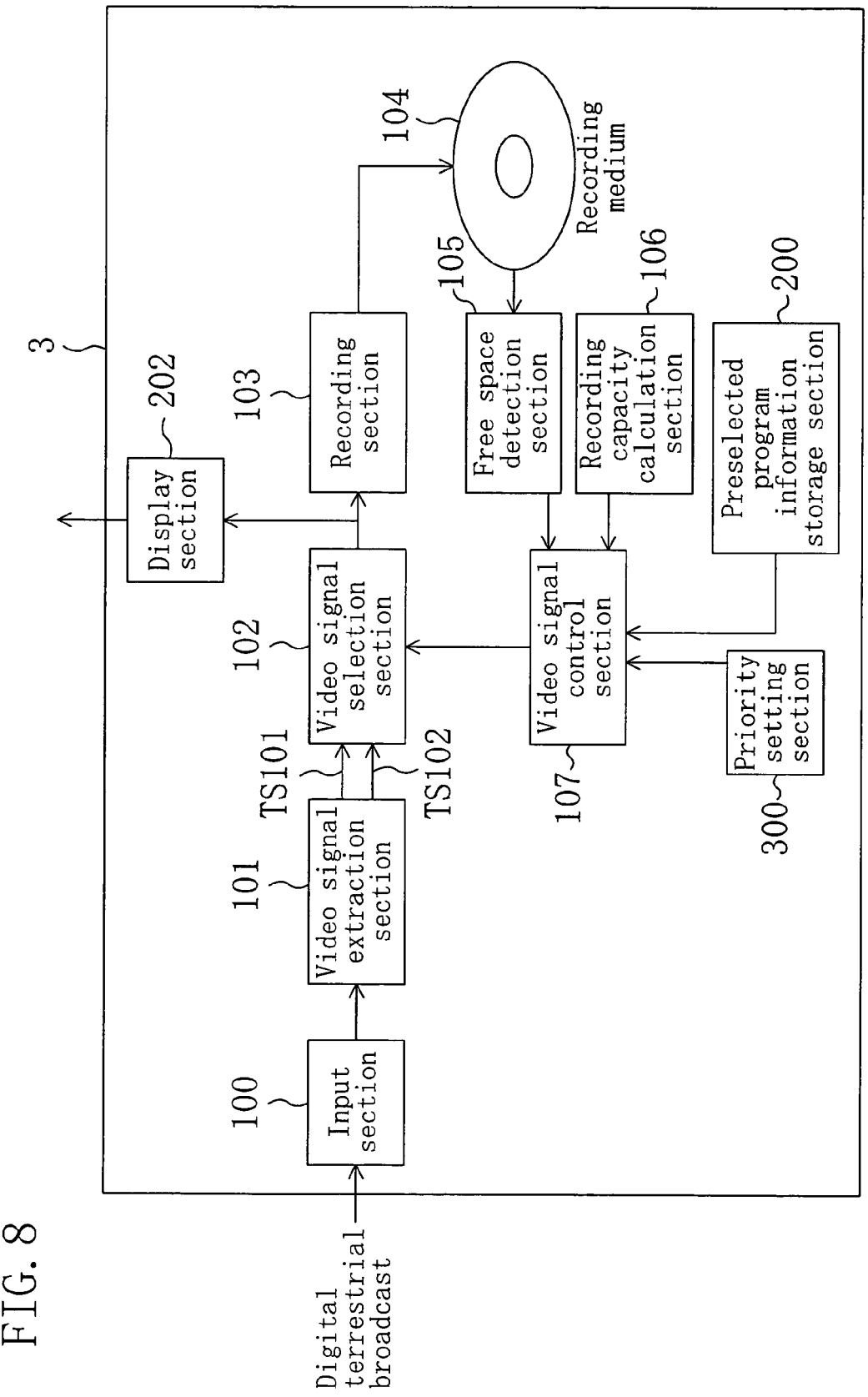
FIG. 8 is a block diagram showing an entire structure of a video signal recording apparatus according to embodiment 3 of the present invention.

FIG. 8 shows the entire structure of a video signal recording apparatus 3 according to embodiment 3 of the present invention. The video signal recording apparatus 3 includes a priority setting section 300 in place of the priority storage section 201 of the video signal recording apparatus 2 shown in FIG. 4. The priority setting section 300 changes the priority threshold value according to a result of comparison at the video signal control section 107 between the free space and the recording capacity.

Figure 9:
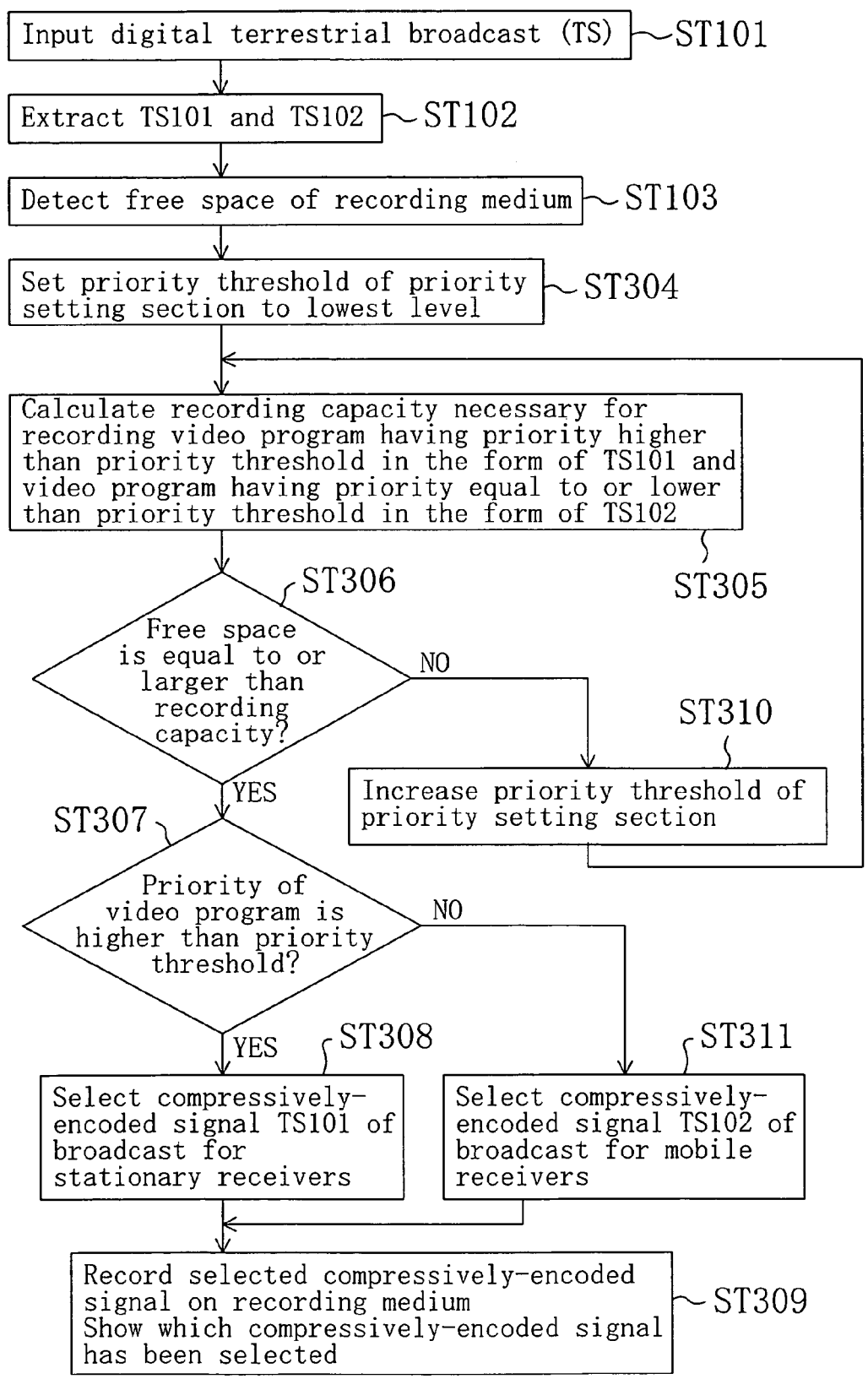
FIG. 9 is a flowchart illustrating an operation of the video signal recording apparatus shown in FIG. 8.

Hereinafter, the operation of the video signal recording apparatus 3 shown in FIG. 8 is described with reference to FIG. 9.

[Steps ST101 to ST103]

First, the processes of steps ST101 to ST103 are performed.

[Step ST304]

The priority setting section 300 sets the priority threshold value to a minimum priority threshold value (lowest level).

[Step ST305]

The recording capacity calculation section 106 refers to the priority of a video program stored in the preselected program information storage section 200 and the priority threshold value set in the priority setting section 300 to calculate the recording capacity necessary for recording a video program whose priority is higher than the priority threshold value in the form of a broadcast for stationary receivers and a video program whose priority is equal to or lower than the priority threshold value in the form of a broadcast for mobile receivers. Specifically, the recording capacity calculation section 106 calculates recording capacity N1 using the time length (broadcast duration) of a video program whose priority is higher than the priority threshold value and the average encoding bit rate of a broadcast for stationary receivers and calculates recording capacity N2 using the time length (broadcast duration) of a video program whose priority is equal to or lower than the priority threshold value and the average encoding bit rate of a broadcast for mobile receivers, and then calculates the sum of recording capacity N1 and recording capacity N2.

[Step ST306]

The video signal control section 107 compares the free space detected by the free space detection section 105 and the recording capacity calculated by the recording capacity calculation section 106. If the free space is equal to or larger than the recording capacity, the process proceeds to step ST307. If the free space is smaller than the recording capacity, the process proceeds to step ST310.

[Step ST307]

The video signal control section 107 compares the priority of a video program with the priority threshold value set in the priority setting section 300. If the priority of the video program is higher than the priority threshold value, the process proceeds to step ST308. If the priority of the video program is equal to or lower than the priority threshold value, the process proceeds to step ST311.

[Step ST308]

The video signal selection section 102 selects transport stream TS101 of a broadcast for stationary receivers from among the transport streams extracted by the video signal extraction section 101. That is, the video signal selection section 102 selects transport stream TS101 for a video program whose priority is higher than the priority threshold value.

[Step ST309]

The recording section 103 records the transport stream selected by the video signal selection section 102 on the recording medium 104. The display section 202 shows which transport stream has been selected by the video signal selection section 102.

[Step ST310]

On the other hand, if the free space is smaller than the recording capacity at step ST306, the priority setting section 300 changes the priority threshold value to a priority threshold value which is higher than the current priority threshold value by one level. Then, the process proceeds to step ST305.

[Step ST311]

On the other hand, if the priority of the program is equal to or lower than the priority threshold value at step ST307, the video signal selection section 102 selects transport stream TS102 of a broadcast for mobile receivers from among the transport streams extracted by the video signal extraction section 101. That is, the video signal selection section 102 selects transport stream TS102 for a video program whose priority is equal to or lower than the priority threshold value. Then, the process proceeds to step ST309.

Figure 10:
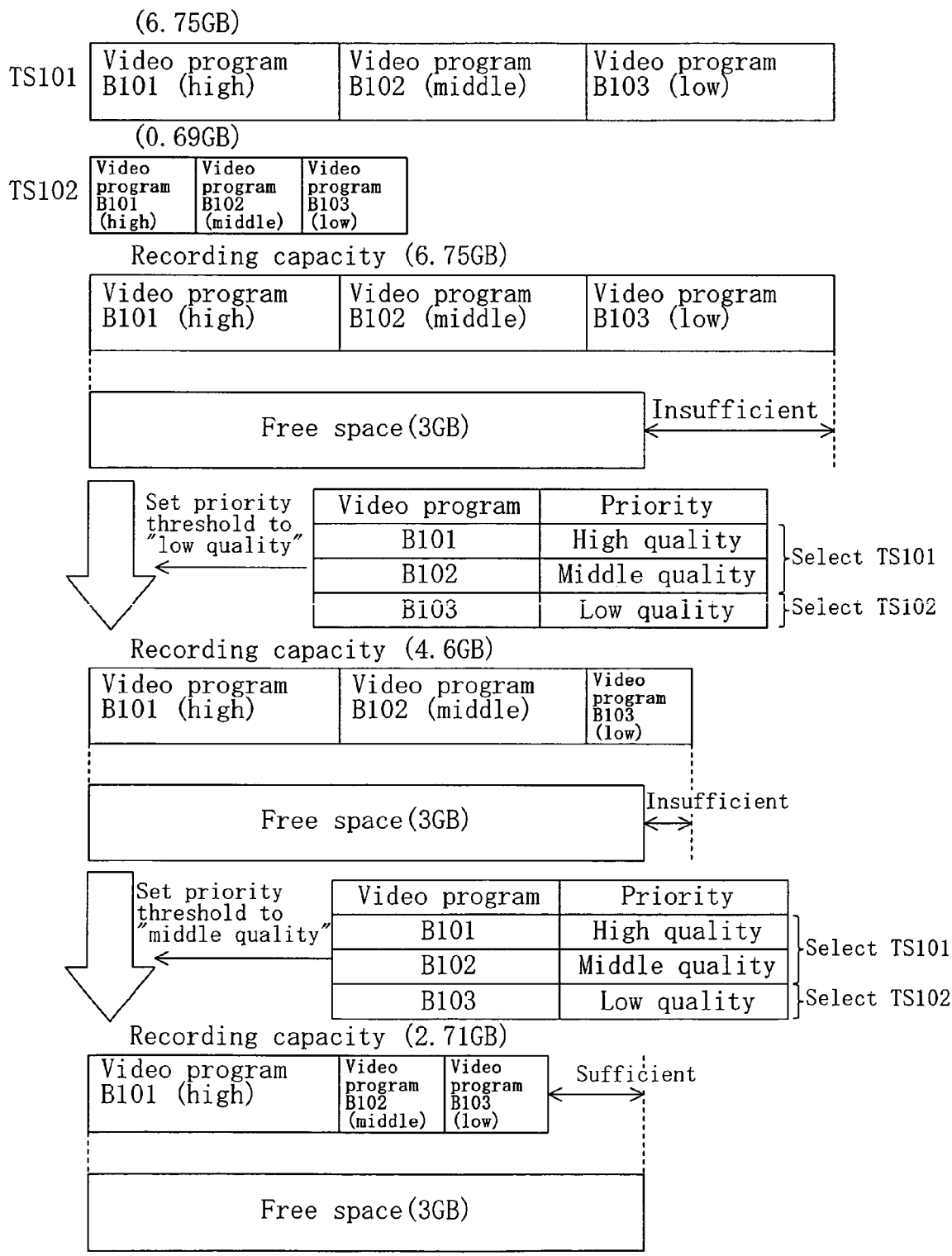
FIG. 10 shows a specific example wherein a video program is recorded on a recording medium by the video signal recording apparatus shown in FIG. 8.

Hereinafter, the above process is further described with specific values with reference to FIG. 10.

Now, consider a case where the preselected program information and priority as shown in FIG. 5 are stored in the preselected program information storage section 200. The total broadcast duration of video programs B101, B102 and B103 is 3 hours. The free space of the recording medium is 3 GB. The average bit rate of a video program for stationary receivers is 5 Mbps. The average bit rate of a video program for mobile receivers is 512 Kbps.

In the process of step ST305, the priority threshold value is set to the lowest level. That is, the recording capacity necessary for entirely recording video programs B101, B102 and B103 in the form of the transport stream of a broadcast for stationary receivers is calculated to be 6.75 GB as shown in Expression 1 of FIG. 28. Thus, the free space is smaller than the recording capacity.

In the process of step ST310, the priority threshold value is increased by one level. That is, the priority threshold value is set to "low quality".

In the process of step ST305, the recording capacity necessary for recording video programs B101 and B102 whose priority (high quality, middle quality) is higher than the priority threshold value (low quality) in the form of transport stream TS101 of a broadcast for stationary receivers and video program B103 whose priority (low quality) is equal to or lower than the priority threshold value (low quality) in the form of transport stream TS102 of a broadcast for mobile receivers is calculated to be 4.73 GB as shown in Expression 4 of FIG. 29. Thus, the free space is smaller than the recording capacity.

In the process of step ST310, the priority threshold value is changed from "low quality" to "middle quality".

In the process of step ST305, The recording capacity necessary for recording video program B101 whose priority (high quality) is higher than the priority threshold value (middle quality) in the form of transport stream TS101 of a broadcast for stationary receivers and video programs B102 and B103 whose priority (middle quality, low quality) is equal to or lower than the priority threshold value (middle quality) in the form of transport stream TS102 of a broadcast for mobile receivers is calculated to be 2.71 GB as shown in Expression 3 of FIG. 29. Thus, the free space is larger than the recording capacity.

In the processes of steps ST308 and ST311, the video signal selection section 102 selects transport stream TS101 of a broadcast for stationary receivers in the case of video program B101 whose priority (high quality) is higher than the priority threshold value, whereas the video signal selection section 102 selects transport stream TS102 of a broadcast for mobile receivers in the case of video programs B102 and B103 whose priority (middle quality, low quality) is equal to or lower than the priority threshold value.

In the process of step ST309, the recording section 103 records the video programs on the recording medium 104 in the form of the transport streams selected by the video signal selection section 102.

As described above, a video program whose priority is higher than the priority threshold value of the priority setting section 300 is recorded in the form of a video signal of a broadcast for stationary receivers, and a video program whose priority is equal to or lower than the priority threshold value of the priority setting section 300 is recorded in the form of a video signal of a broadcast for mobile receivers. That is, the priority is set by the priority setting section 300 such that the recording capacity necessary for recording a plurality of video programs is equal to or smaller than the free space of a recording medium. As a result, a plurality of video programs can be entirely recorded on the recording medium.

Embodiment 4

Figure 11:
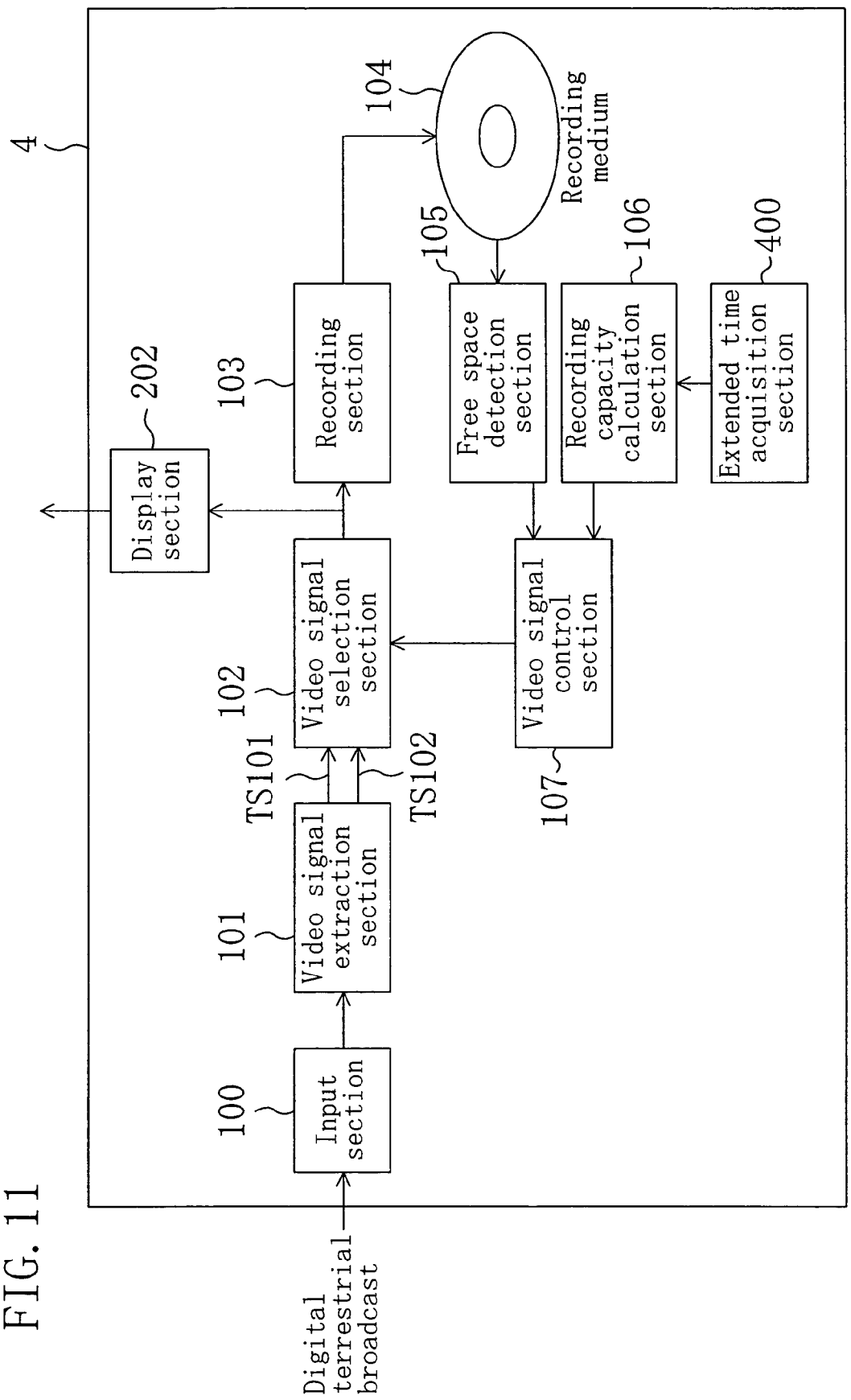
FIG. 11 is a block diagram showing an entire structure of a video signal recording apparatus according to embodiment 4 of the present invention.

FIG. 11 shows the entire structure of a video signal recording apparatus 4 according to embodiment 4 of the present invention. The video signal recording apparatus 4 includes an extended time acquisition section 400 and a display section 202 in addition to the components of the video signal recording apparatus 1 of FIG. 1. The extended time acquisition section 400 acquires the extended time of a video program whose broadcast duration can be extended from the SI (Service Information) data included in a transport stream. The display section 202 shows which transport stream has been selected by the video signal selection section 102.

Figure 12:
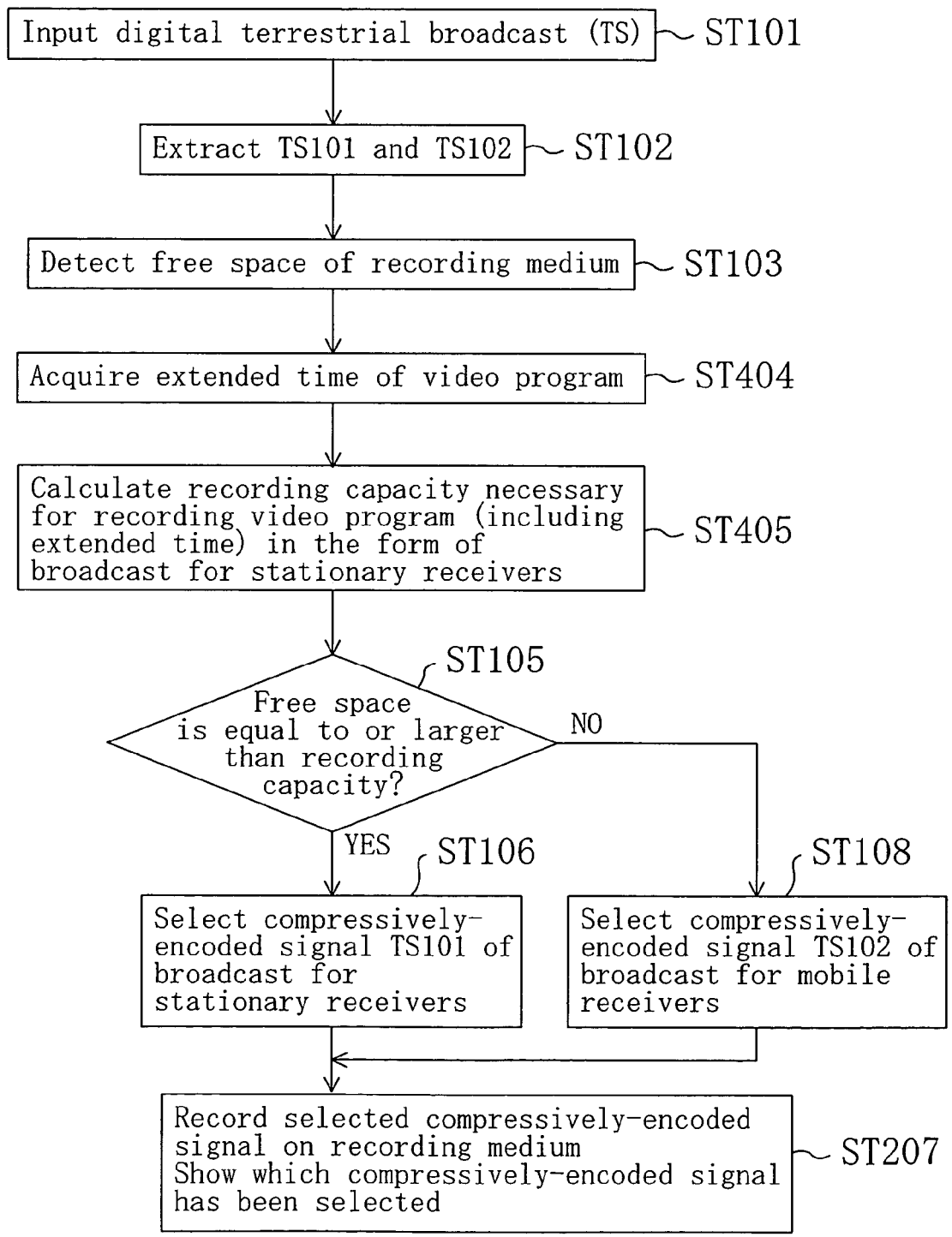
FIG. 12 is a flowchart illustrating an operation of the video signal recording apparatus shown in FIG. 11.

Hereinafter, the operation of the video signal recording apparatus 4 shown in FIG. 11 is described with reference to FIG. 12.

[Steps ST101 to ST103]

First, the processes of steps ST101 to ST103 are performed.

[Step ST404]

The extended time acquisition section 400 acquires the extended time of a video program whose broadcast duration can be extended from the SI (Service Information) data included in a transport stream.

[Step ST405]

The recording capacity calculation section 106 calculates the recording capacity using the time length (broadcast duration), which includes an original broadcast duration of the video program and the extended time acquired by the extended time acquisition section 400, and the average encoding bit rate of the video program for stationary receivers.

[Steps ST105, ST106, ST207 and ST108]

The processes of steps ST105, ST106, ST207 and ST108 are performed, whereby the video program is recorded on the recording medium 104. The display section 202 shows which transport stream has been selected by the video signal selection section 102.

As described above, a video program is entirely recorded even when the broadcast duration of the video program is extended.

Embodiment 5

Figure 13:
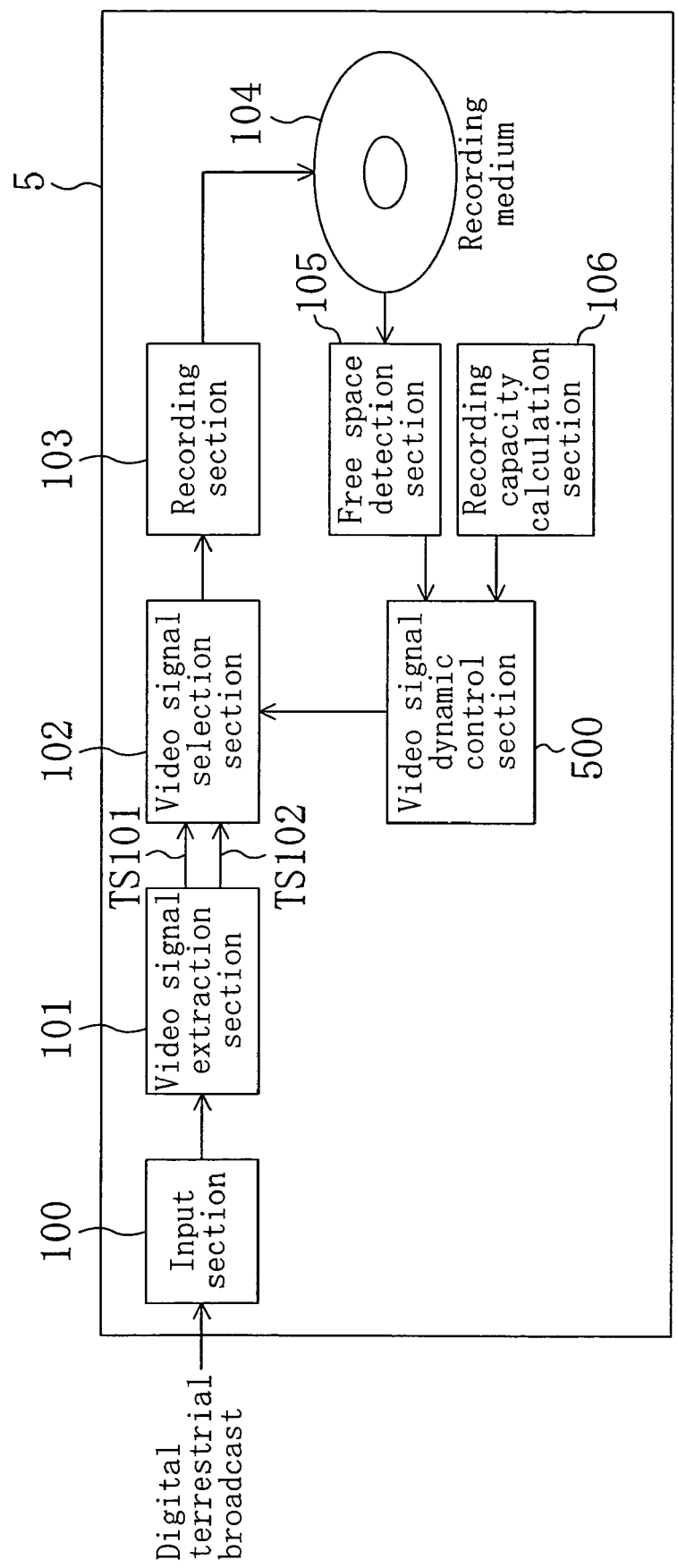
FIG. 13 is a block diagram showing an entire structure of a video signal recording apparatus according to embodiment 5 of the present invention.

FIG. 13 shows the entire structure of a video signal recording apparatus 5 according to embodiment 5 of the present invention. The video signal recording apparatus 5 includes a video signal dynamic control section 500 in place of the video signal control section 107 of the video signal recording apparatus 1 shown in FIG. 1. The free space detection section 105 detects the free space of the recording medium 104. The recording capacity calculation section 106 calculates the recording capacity necessary for recording a remaining part of a video program (a part of a video program to be recorded which has not yet been recorded on the recording medium 104). The video signal dynamic control section 500 determines whether or not the free space of the recording medium 104 is larger than the recording capacity during the recording of a video program on the recording medium 104 by the recording section 103. The video signal selection section 102 changes a currently-selected video signal according to the determination by the video signal dynamic control section 500.

Figure 14:
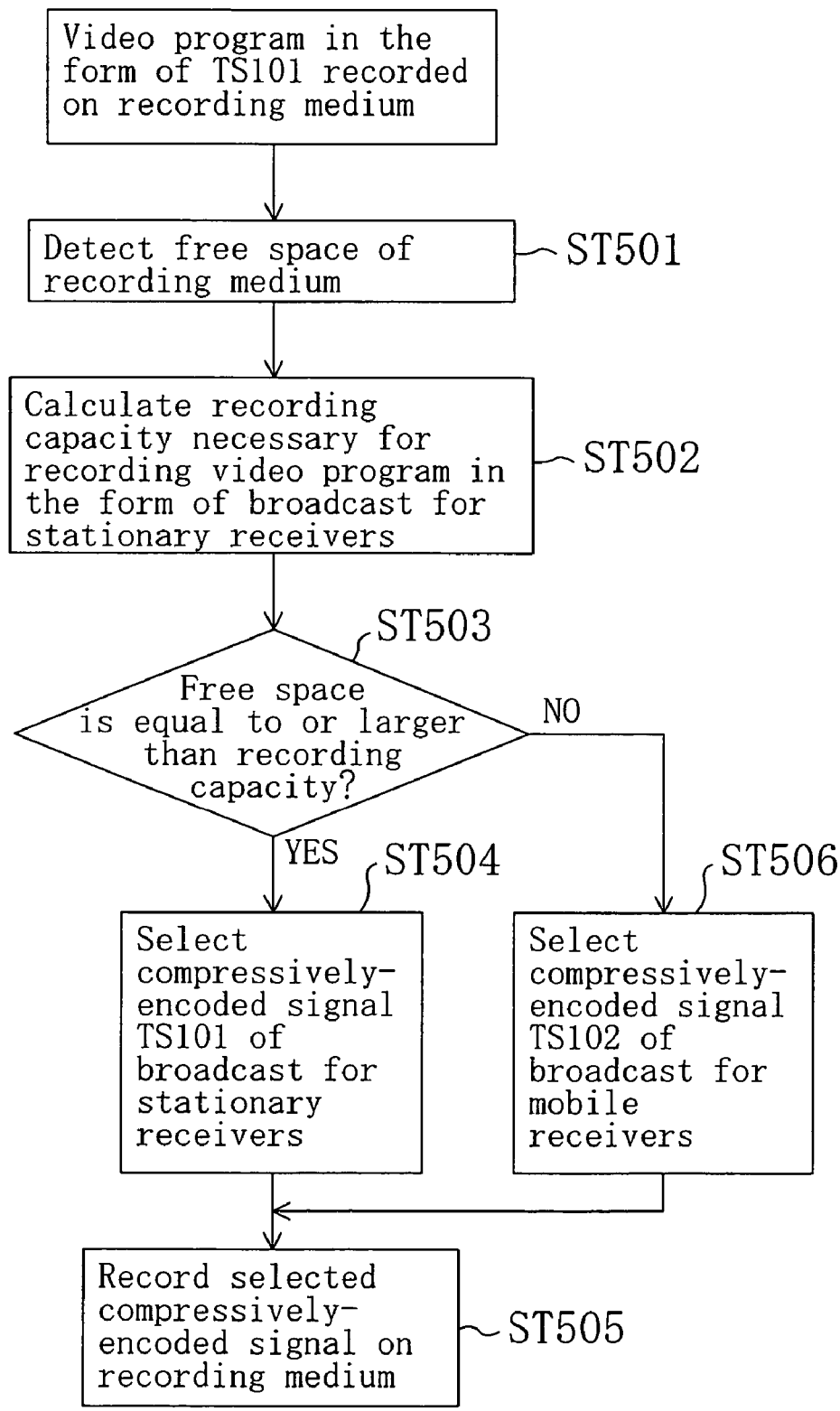
FIG. 14 is a flowchart illustrating an operation of the video signal recording apparatus shown in FIG. 13.

Hereinafter, the operation of the video signal recording apparatus 5 shown in FIG. 13 is described with reference to FIG. 14.

First, the processes of steps ST101 to ST108 are performed. Specifically, the video signal selection section 102 selects transport stream TS101 of a broadcast for stationary receivers, and the recording section 103 records the video program in the form of the video signal (TS101) on the recording medium 104. It should be noted that the process performed by the video signal control section 107 at step ST105 is instead performed by the video signal dynamic control section 500 in embodiment 5. In embodiment 5, the following process is performed in parallel with the above processes (steps ST101 to ST108).

[Step ST501]

The free space detection section 105 detects the remaining free space of the recording medium 104.

[Step ST502]

The recording capacity calculation section 106 calculates the recording capacity necessary for recording a remaining part of a video program (a part of a video program to be recorded which has not yet been recorded) on the recording medium 104 based on the average encoding bit rate of a video program for stationary receivers.

[Step ST503]

The video signal dynamic control section 500 compares the free space detected by the free space detection section 105 and the recording capacity calculated by the recording capacity calculation section 106. If the free space is equal to or larger than the recording capacity, the process proceeds to step ST504. If the free space is smaller than the recording capacity, the process proceeds to step ST506.

[Step ST504]

The video signal selection section 102 continues to select transport stream TS101 which has been currently selected.

[Step ST505]

The recording section 103 records the video program in the form of the transport stream selected by the video signal selection section 102 on the recording medium 104.

[Step ST506]

If it is determined at step ST503 that the free space is smaller than the recording capacity, the video signal selection section 102 selects transport stream TS102 of a broadcast for mobile receivers in place of the currently-selected transport stream TS101.

In this way, the video signal dynamic control section 500 performs the above processes (steps ST501 to ST506) whenever necessary.

Figure 15:
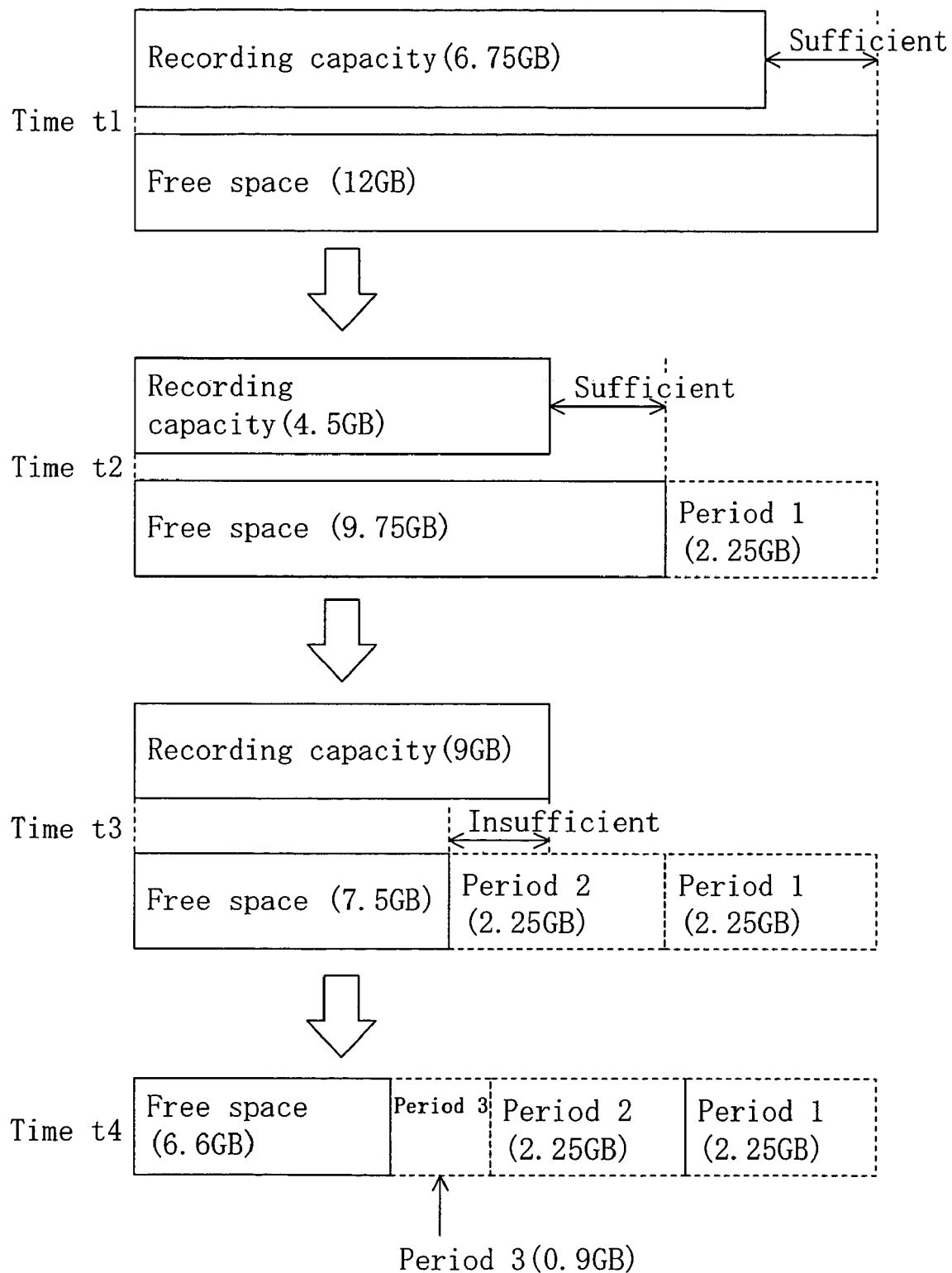
FIG. 15 shows a specific example wherein a video program is recorded on a recording medium by the video signal recording apparatus shown in FIG. 13.
Figure 16:
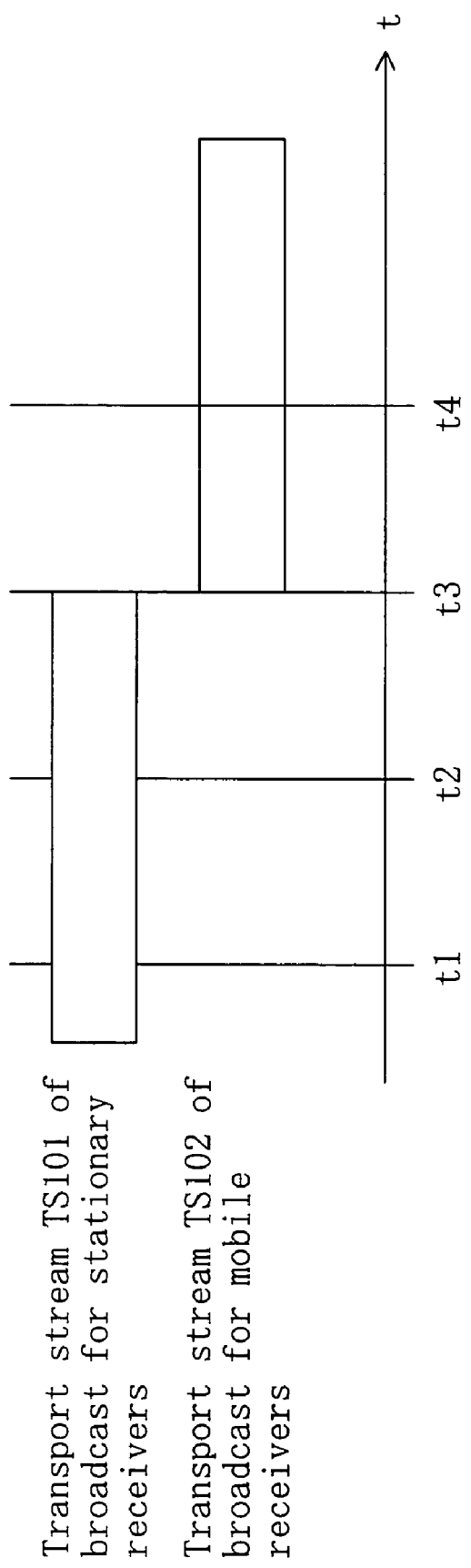
FIG. 16 is a timing chart illustrating an operation of the video signal recording apparatus shown in FIG. 13.

Hereinafter, the above processes are further described with reference to the timing charts of FIGS. 15 and 16.

Now, consider a case where the above processes are performed under the following conditions.

Herein, the total broadcast duration (from time t1 to time t4) is 3 hours. The free space of the recording medium at time t1 is 12 GB. The recording capacity calculation section 106 calculates the recording capacity under the conditions that the encoding bit rate of a video program for stationary receivers at times t1, t2 and t3 is 5 Mbps, 5 Mbps and 20 Mbps, respectively, and the encoding bit rate of a video program for mobile receivers at times t1, t2 and t3 is 512 Kbps, 512 Kbps and 2000 Kbps, respectively. In the case where the encoding bit rate of a video program is largely changed (e.g., a case where the broadcast system of the digital terrestrial broadcast is changed before time t3, a case where video images are changed from a scene of moderate movement to a scene of busy movement around time t3, etc.), the recording capacity calculation section 106 changes the average encoding bit rate used for calculation according to the change in the encoding bit rate of the video program. Each of the time intervals of time t1 to time t2 (period 1), time t2 to time t3 (period 2), and time t3 to time t4 (period 3) is one hour.

At time t1, time t2 and time t3, the above processes (step ST501 to step ST506) are performed.

First, transport stream TS101 has been selected by the video signal selection section 102.

Then, at time t1, the processes of step ST501 to step ST506 are performed. The free space is 12 GB at time t1. The recording capacity is calculated to be 6.75 GB as shown in Expression 5 of FIG. 30.

At this point in time, the free space is larger than the recording capacity. Thus, transport stream TS101 remains selected by the video signal selection section 102.

At time t2, the processes of step ST501 to step ST506 are performed as done at time t1. Since a 2.25 GB part of the video program has been recoded on the recording medium 104 during period 1, the free space of the recording medium 104 results in 9.75 GB. The recording capacity is calculated to be 4.73 GB as shown in Expression 6 of FIG. 30.

At this point in time, the free space is larger than the recording capacity. Thus, transport stream TS101 remains selected by the video signal selection section 102.

At time t3, the processes of step ST501 to step ST506 are performed as done at time t1. Since a 2.25 GB part of the video program has been recoded on the recording medium 104 during period 2, the free space of the recording medium 104 results in 7.5 GB. The recording capacity is calculated to be 9 GB as shown in Expression 7 of FIG. 30.

At this point in time, the free space is smaller than the recording capacity. Thus, the video signal selection section 102 selects transport stream TS102 of a broadcast for mobile receivers in place of transport stream TS101.

At time t4, since a 0.9 GB part of the video program has been recoded on the recording medium 104 during period 3, the free space of the recording medium 104 results in 6.6 GB.

As described above, according to embodiment 5, the encoding bit rate of a video program can be changed. Thus, the video program can be entirely recorded even when the recording capacity necessary for recording the video program is increased.

It should be noted that in the processes of step ST101 to step ST108, the video signal control section 107 may select transport stream TS102 of a broadcast for mobile receivers.

Embodiment 6

Figure 17:
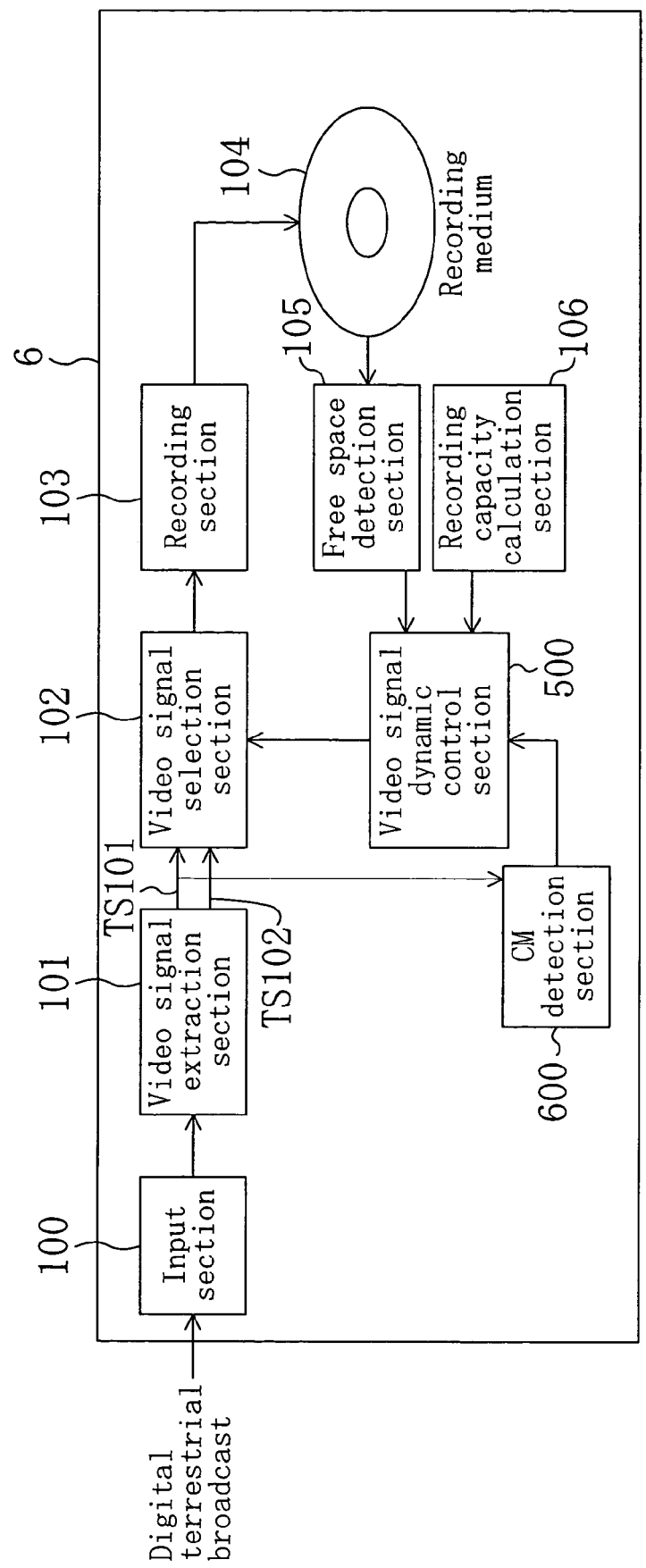
FIG. 17 is a block diagram showing an entire structure of a video signal recording apparatus according to embodiment 6 of the present invention.

FIG. 17 shows the entire structure of a video signal recording apparatus 6 according to embodiment 6 of the present invention. The video signal recording apparatus 6 includes a CM detection section 600 in addition to the components of the video signal recording apparatus 5 of FIG. 13. The CM detection section 600 detects a commercial (CM) included in a video program in a transport stream input to the input section 100. The video signal selection section 102 switches a currently-selected video signal according to the determination of the video signal dynamic control section 500 during a period when a CM is detected by the CM detection section 600.

Figure 18:
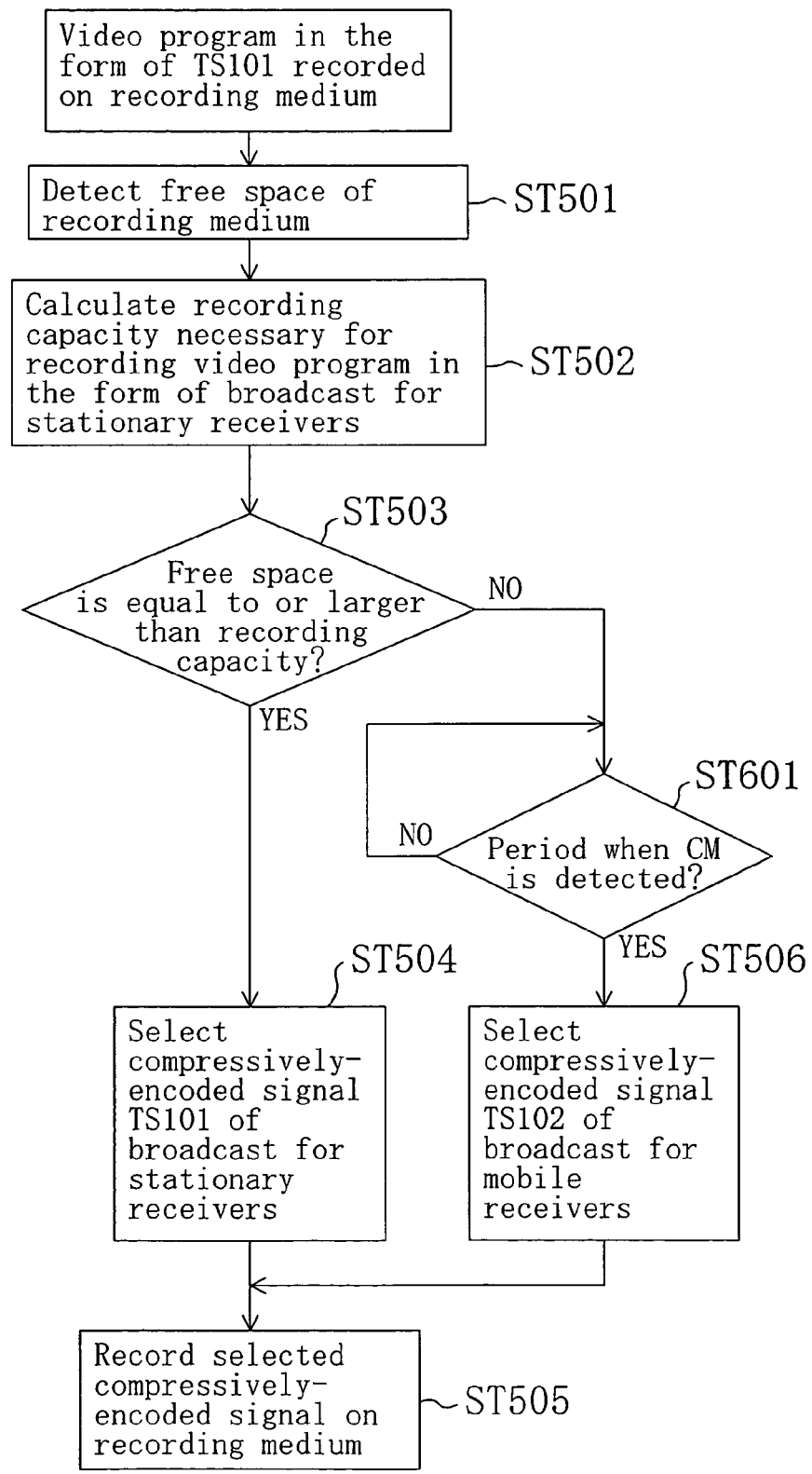
FIG. 18 is a flowchart illustrating an operation of the video signal recording apparatus shown in FIG. 17.

Hereinafter, the operation of the video signal recording apparatus 6 shown in FIG. 17 is described with reference to FIG. 18.

In the operation of embodiment 6, the process of step ST601 is performed immediately before step ST506 of the process of embodiment 5.

[Step ST601]

If it is determined at step ST503 that the free space detected by the free space detection section 105 is smaller than the recording capacity calculated by the recording capacity calculation section 106, the video signal dynamic control section 500 determines whether or not a CM is detected by the CM detection section 600. That is, the video signal dynamic control section 500 determines whether or not the content of a video program which is represented by the transport stream currently input to the input section 100 is a CM. The process of step ST601 is continued till the video signal dynamic control section 500 determines that a CM is detected. If the video signal dynamic control section 500 determines that a CM is detected, the process proceeds to step ST506.

Hereinafter, the above processes are further described with reference to the timing chart of FIG. 19.

Figure 19:
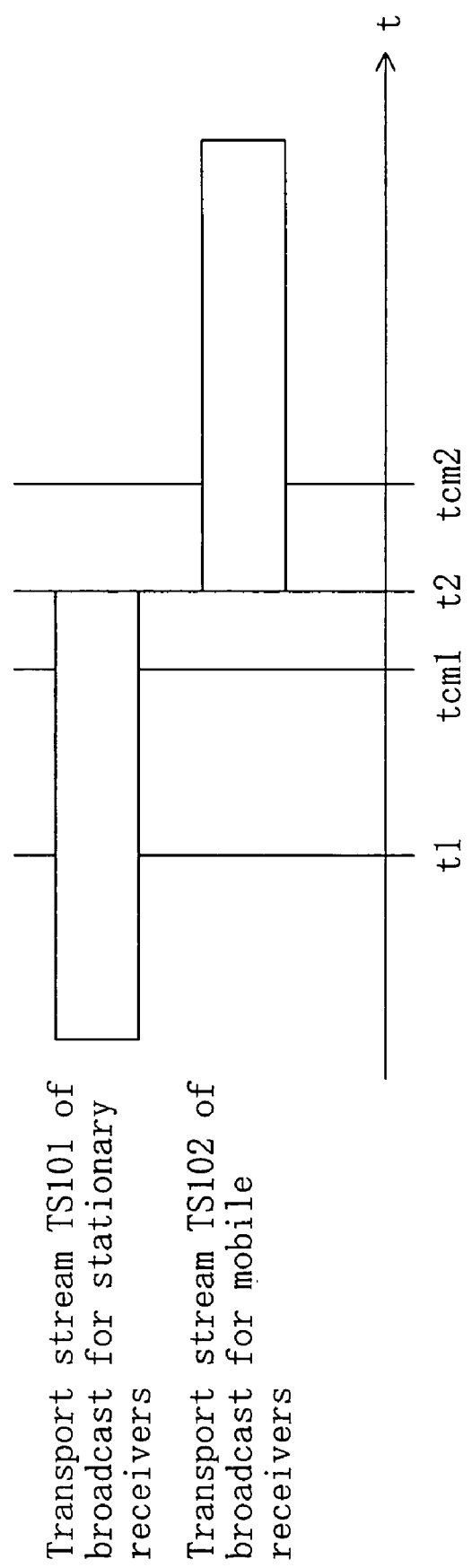
FIG. 19 is a timing chart illustrating an operation of the video signal recording apparatus shown in FIG. 17.

The above processes (steps ST501 to ST506 and step ST601) are performed at time t1 and time t2 of FIG. 19. The content of the video program is a CM during an interval between time tcm1 and time tcm2. Herein, time t2 is any time occurring between time tcm1 and time tcm2.

First, transport stream TS101 has been selected by the video signal selection section 102.

Then, at time t1, the processes of step ST501 to step ST503 are performed. The video signal control section 107 determines that the free space is smaller than the recording capacity. At this point in time, the CM detection section 600 detects no CM in transport stream TS101. Thus, the process does not proceed to step ST506, and transport stream TS101 remains selected by the video signal selection section 102.

During the interval between time tcm1 and time tcm2, the CM detection section 600 detects a CM in transport stream TS101.

Since the CM detection section 600 detects a CM during the interval between time tcm1 and time tcm2, the video signal selection section 102 selects transport stream TS102 of a broadcast for mobile receivers at time t2.

As described above, the transport stream is switched during a commercial part of a video program from transport stream TS101 of a broadcast for stationary receivers to transport stream TS102 of a broadcast for mobile receivers. As a result, occurrence of an interruption in the middle of the main part of the video program is prevented, although an interruption occurs in the middle of the commercial part.

It should be noted that in the processes of step ST101 to step ST108, the video signal control section 107 may select transport stream TS102 of a broadcast for mobile receivers. In this case, the process of step ST601 is performed not immediately before the process of step ST506 but immediately before the process of step ST504. That is, the process of step ST601 is performed before the video signal selection section 102 changes a currently-selected transport stream.

Embodiment 7

Figure 20:
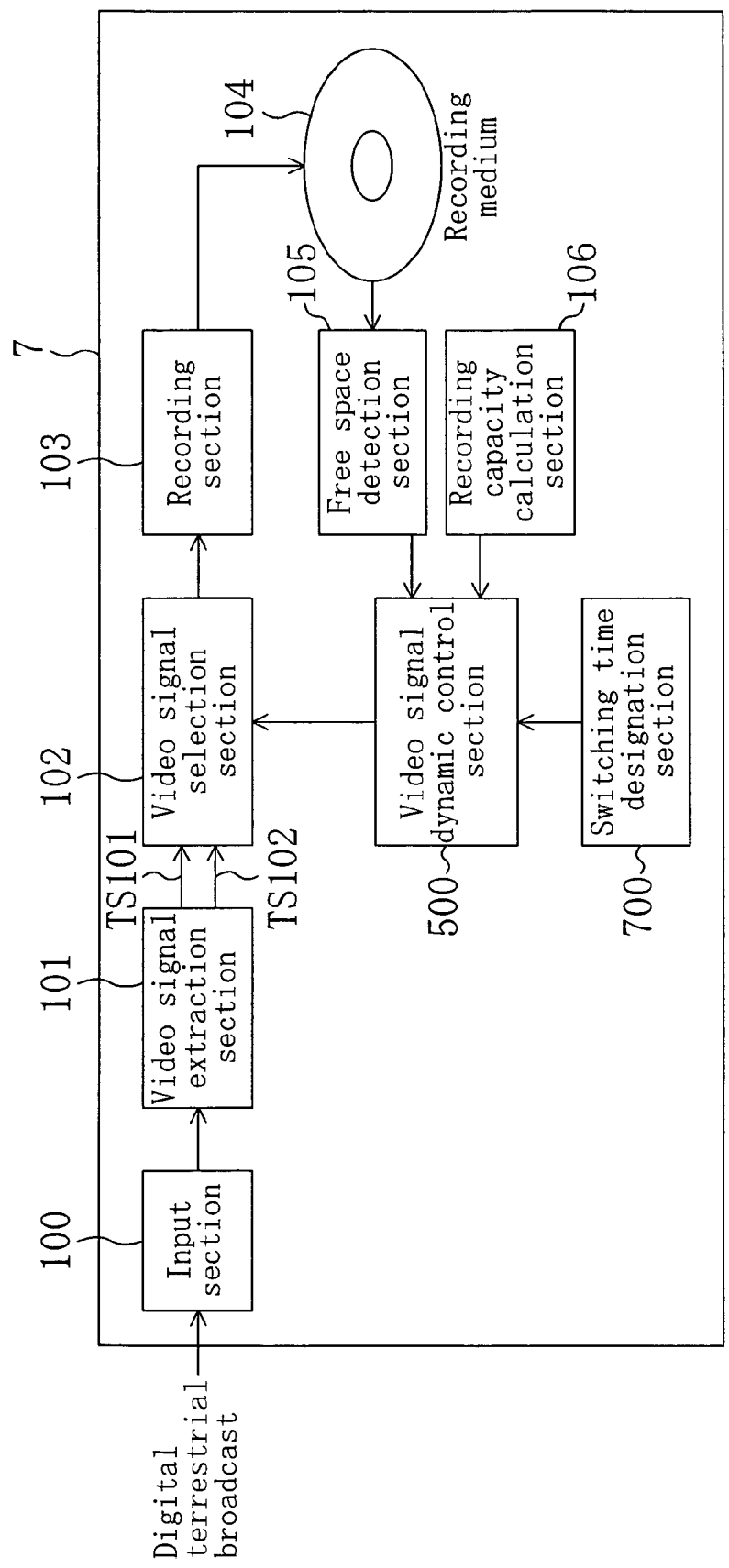
FIG. 20 is a block diagram showing an entire structure of a video signal recording apparatus according to embodiment 7 of the present invention.

FIG. 20 shows the entire structure of a video signal recording apparatus 7 according to embodiment 7 of the present invention. The video signal recording apparatus 7 includes a switching time designation section 700 in addition to the components of the video signal recording apparatus 5 of FIG. 13. The switching time designation section 700 stores the time period when the video signal selection section 102 selects both of the video signals at the time of switching the video signal. The video signal selection section 102 selects both of the video signals during a switching period stored in the switching time designation section 700 according to the determination of the video signal dynamic control section 500, and then switches the video signals.

Figure 21:
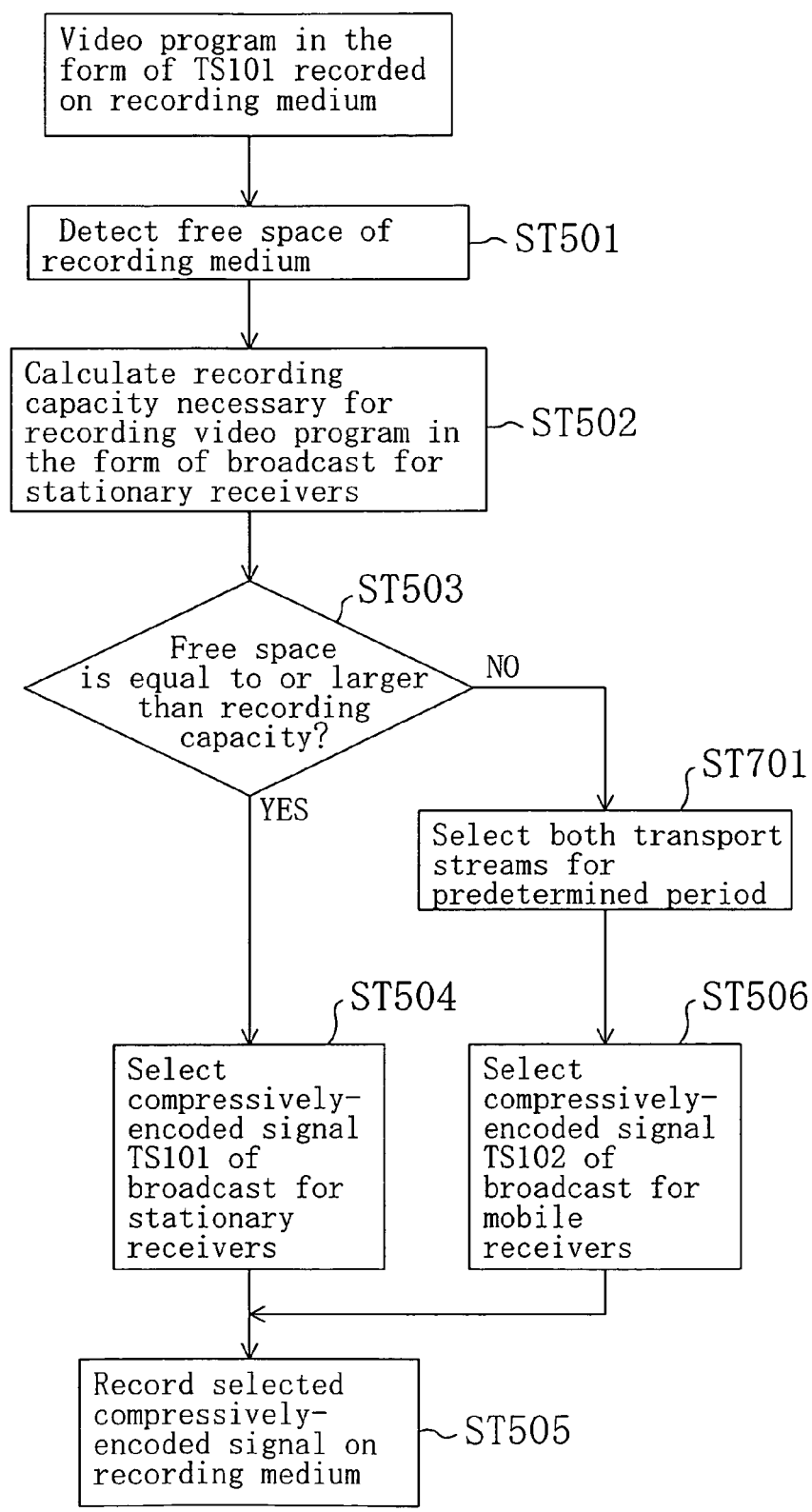
FIG. 21 is a flowchart illustrating an operation of the video signal recording apparatus shown in FIG. 20.

Hereinafter, the operation of the video signal recording apparatus 7 shown in FIG. 20 is described with reference to FIG. 21.

In the operation of embodiment 7, the process of step ST701 is performed immediately before step ST506 of the process of embodiment 5.

[Step ST701]

If it is determined at step ST503 that the free space detected by the free space detection section 105 is smaller than the recording capacity calculated by the recording capacity calculation section 106, the video signal selection section 102 outputs transport stream TS102 of a broadcast for mobile receivers to the recording section 103 in addition to transport stream TS101 of a broadcast for stationary receivers which is currently selected and output to the recording section 103. That is, the video signal selection section 102 selects both transport stream TS101 and transport stream TS102 for a predetermined period. Then, the process proceeds to step ST506.

Figure 22:
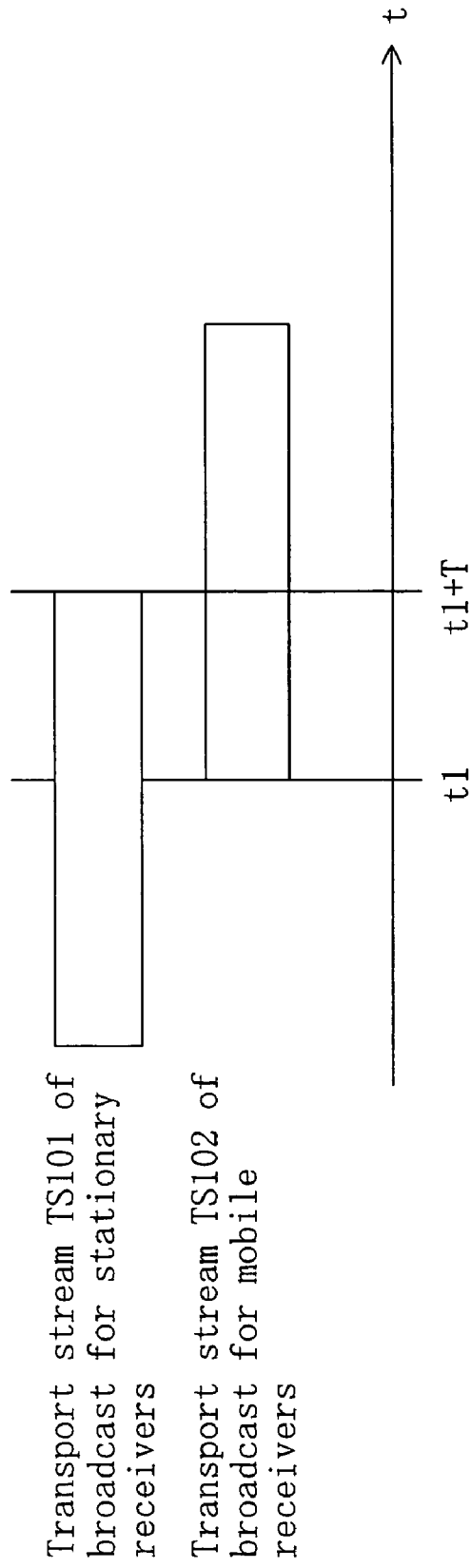
FIG. 22 is a timing chart illustrating an operation of the video signal recording apparatus shown in FIG. 20.

Hereinafter, the above process is further described with reference to the timing chart shown in FIG. 22.

First, transport stream TS101 has been selected by the video signal selection section 102.

Then, at time t1, the video signal dynamic control section 500 determines that the free space is smaller than the recording capacity. Thus, the video signal selection section 102 selects both transport stream TS101 and transport stream TS102 for predetermined period T. That is, the recording section 103 records both transport stream TS101 and transport stream TS102 on the recording medium 104 during an interval between time t1 and time t1+T.

After predetermined time T has elapsed, i.e., at time t1+T, the video signal selection section 102 only selects transport stream TS102.

As described above, at the time of switching from transport stream TS101 of a broadcast for stationary receivers to transport stream TS102 of a broadcast for mobile receivers, both of the transport streams are selected and recorded for a predetermined period, whereby occurrence of an interruption in a video program is prevented.

It should be noted that in the processes of step ST101 to step ST108, the video signal control section 107 may select transport stream TS102 of a broadcast for mobile receivers. In this case, the process of step ST701 is performed not immediately before the process of step ST506 but immediately before the process of step ST504. That is, the process of step ST701 is performed before the video signal selection section 102 changes a currently-selected transport stream.

Embodiment 8

Figure 23:
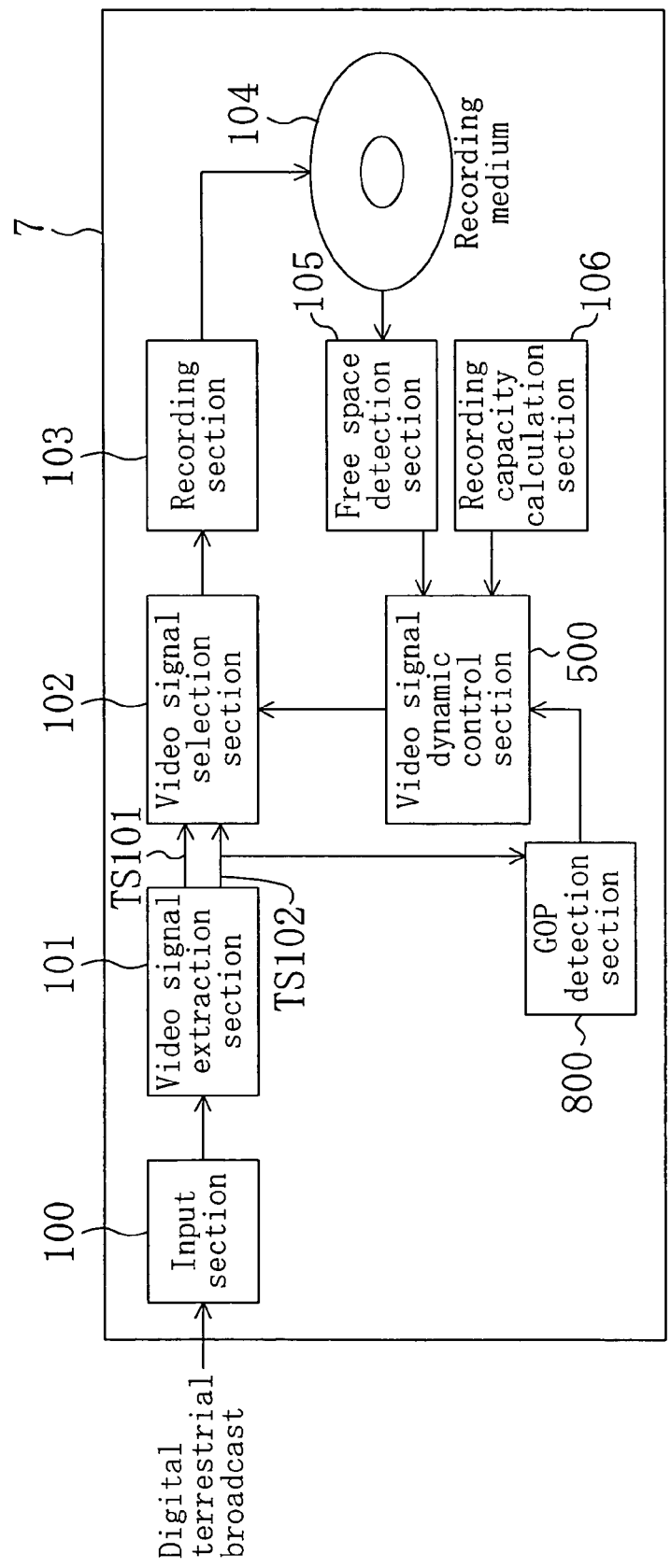
FIG. 23 is a block diagram showing an entire structure of a video signal recording apparatus according to embodiment 8 of the present invention.

FIG. 23 shows the entire structure of a video signal recording apparatus 8 according to embodiment 8 of the present invention. The video signal recording apparatus 8 includes a GOP detection section 800 in addition to the components of the video signal recording apparatus 5 of FIG. 13. The GOP detection section 800 detects the leading part of a GOP in a video signal.

In the first place, the GOP is described.

MPEG defines three types of pictures, i.e., I picture, an original picture of which can be decoded only with data in a frame, and P picture and B picture, an original picture of which cannot be decoded without data from other frames. MPEG further defines GOP (Group of Pictures) structure obtained by grouping a plurality of pieces of display data including at least one I picture. An MPEG-encoded video signal can be decoded from any position/time of the video signal only with a unit of GOP to provide decoded video. However, on the other hand, at the time of switching the video signal, if the video signal is recorded from the middle of a GOP, the video of the GOP cannot be decoded, and as a result, video is interrupted.

Figure 24:
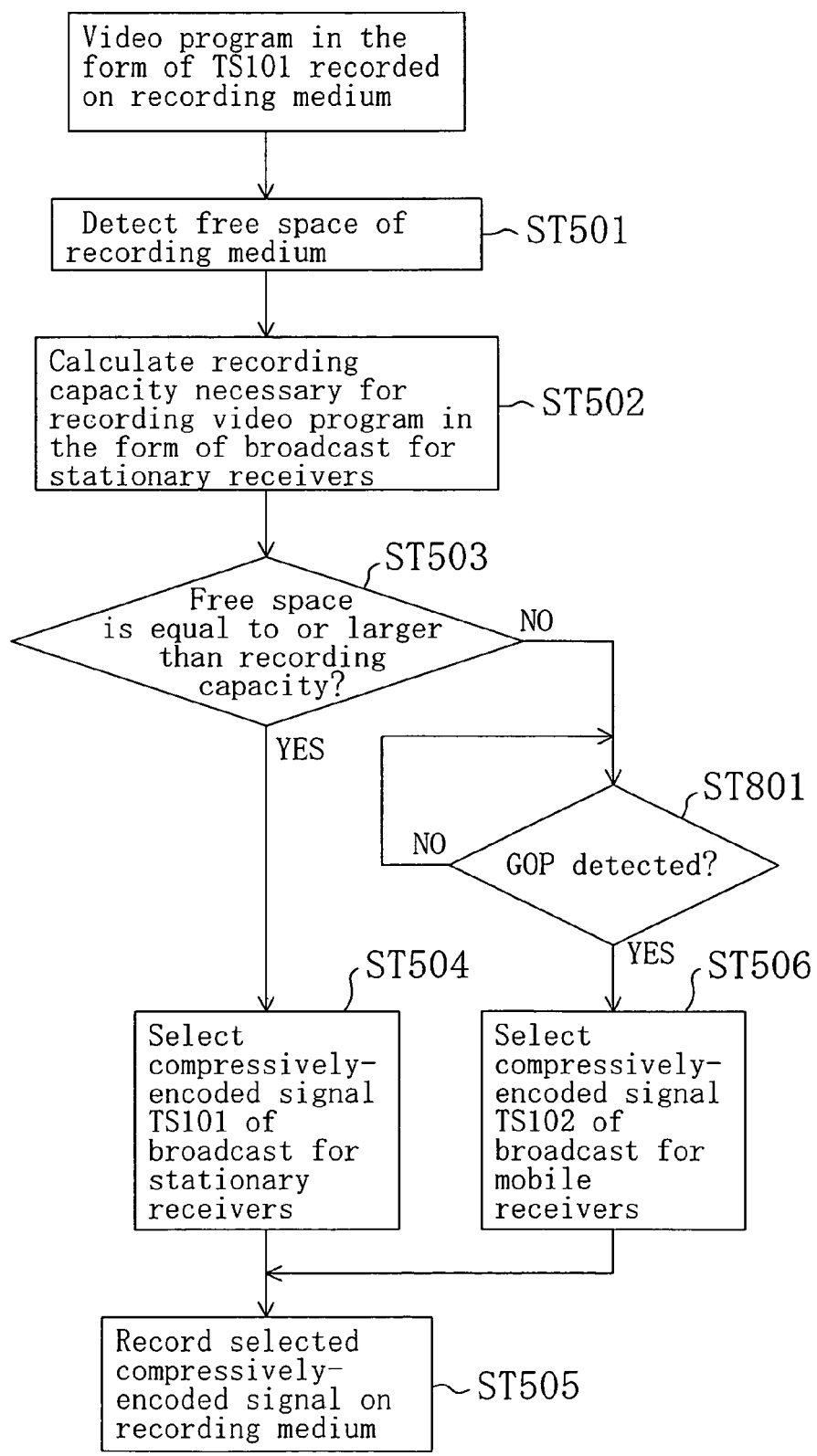
FIG. 24 is a flowchart illustrating an operation of the video signal recording apparatus shown in FIG. 23.

Hereinafter, the operation of the video signal recording apparatus 8 shown in FIG. 23 is described with reference to FIG. 24.

In the operation of embodiment 8, the process of step ST801 is performed immediately before step ST506 of the process of embodiment 5.

[Step ST801]

If it is determined at step ST503 that the free space detected by the free space detection section 105 is smaller than the recording capacity calculated by the recording capacity calculation section 106, the video signal dynamic control section 500 determines whether or not the leading part of a GOP is detected in transport stream TS102 by the GOP detection section 800. The process of step ST801 is repeated till the video signal dynamic control section 500 determines that a GOP is detected. When the video signal dynamic control section 500 determines that a GOP is detected, the process proceeds to step ST506.

Figure 25:
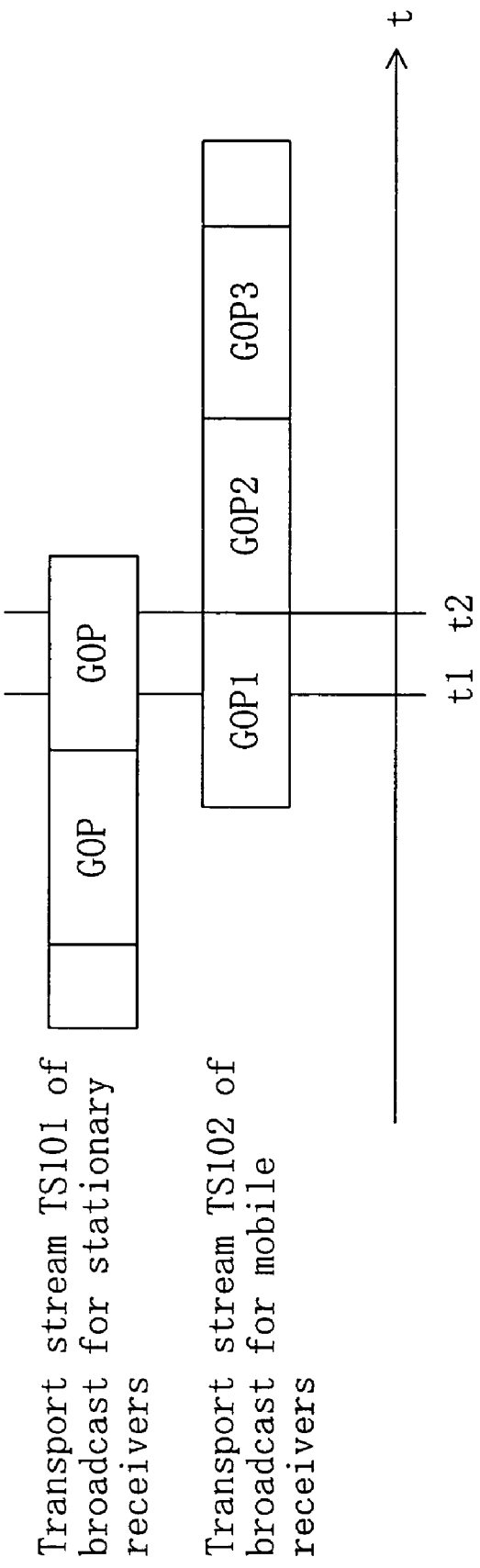
FIG. 25 is a timing chart illustrating an operation of the video signal recording apparatus shown in FIG. 23.
Figure 26:
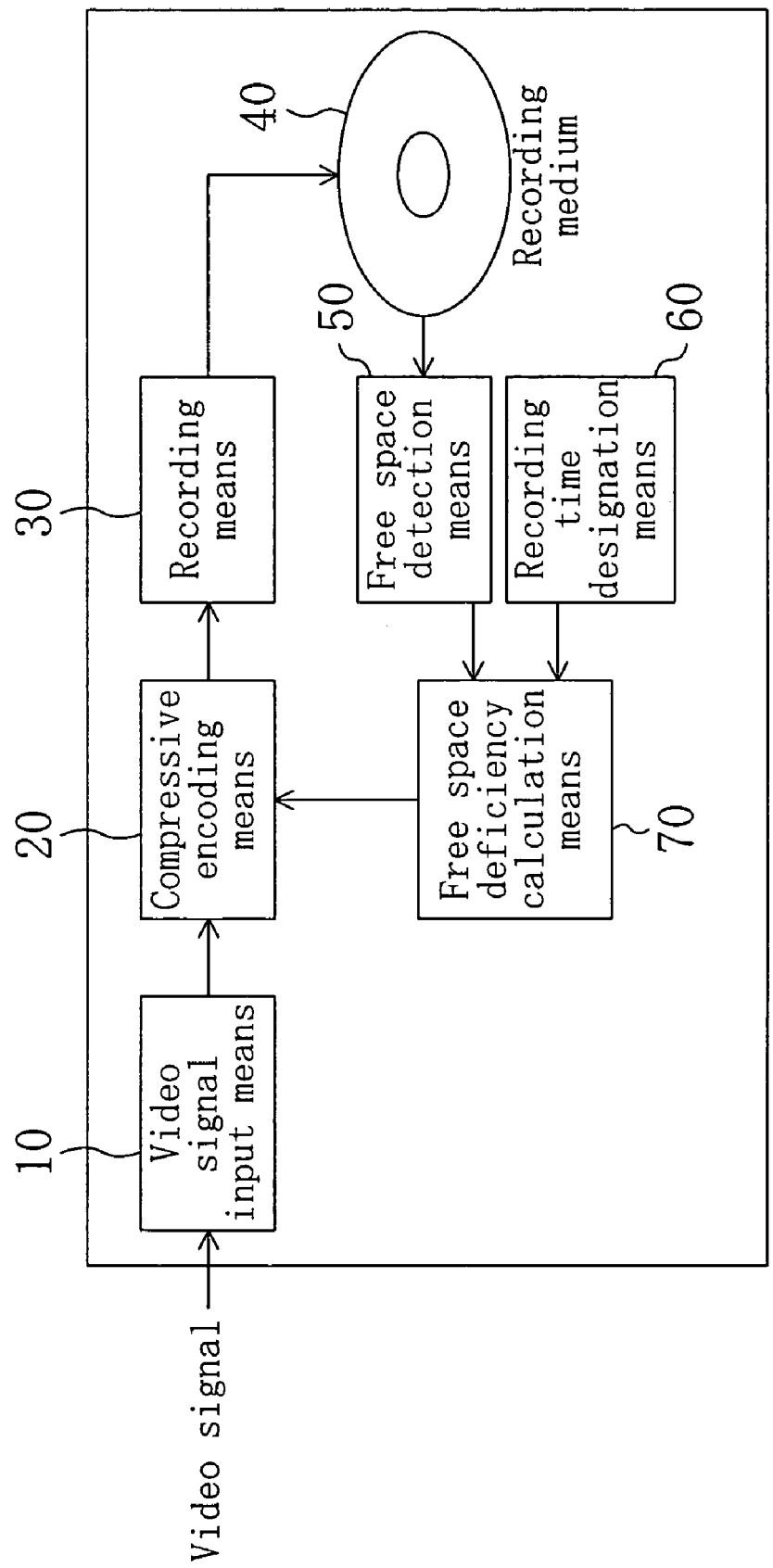
FIG. 26 is a block diagram showing an entire structure of a conventional recording/reproduction apparatus.
Figure 27:
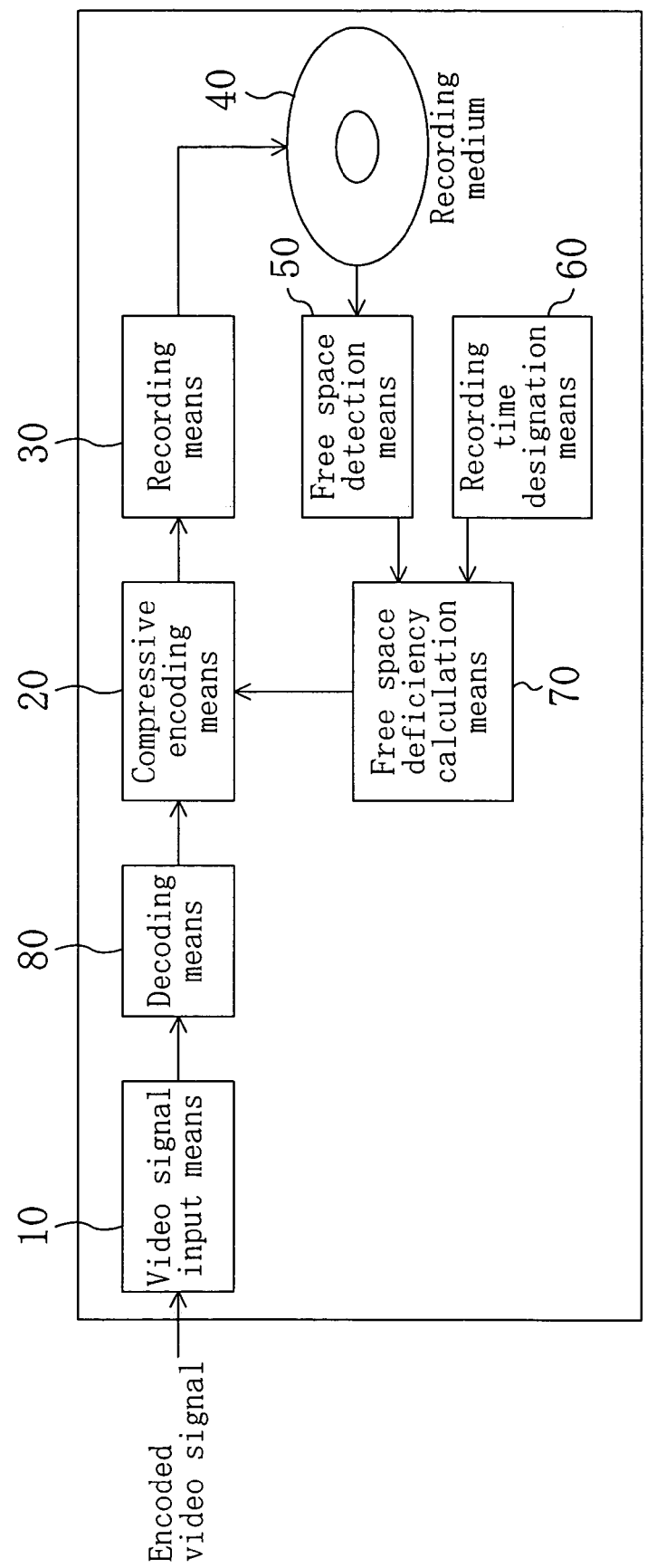
FIG. 27 is a block diagram showing an entire structure of another conventional recording/reproduction apparatus in which an encoded video signal is input.

Hereinafter, the above process is further described with reference to the timing chart shown in FIG. 25.

First, transport stream TS101 has been selected by the video signal selection section 102.

Then, at time t1, the video signal dynamic control section 500 determines that the free space is smaller than the recording capacity. At this point in time, the GOP detection section 800 has not yet detected the leading part of GOP2 in transport stream TS102. Thus, transport stream TS101 remains selected by the video signal selection section 102.

At time t2, the GOP detection section 800 detects the leading part of GOP2 in transport stream TS102. Since the video signal dynamic control section 500 has determined at time t1 that the free space is smaller than the recording capacity, the video signal selection section 102 selects transport stream TS102 of a broadcast for mobile receivers after time t2. That is, selection of transport stream TS102 of a broadcast for mobile receivers is started from the leading part of GOP2.

As described above, at the time of switching from transport stream TS101 of a broadcast for stationary receivers to transport stream TS102 of a broadcast for mobile receivers, transport stream TS101 is switched to transport stream TS102 after the leading part of a GOP is detected in transport stream TS102, whereby recording of a video program is prevented from being interrupted.

It should be noted that in the processes of step ST101 to step ST108, the video signal dynamic control section 500 may select transport stream TS102 of a broadcast for mobile receivers. In this case, the process of step ST801 is performed not immediately before the process of step ST506 but immediately before the process of step ST504. That is, the process of step ST801 is performed before the video signal selection section 102 changes a currently-selected transport stream.

Embodiment 9

Figure 31:
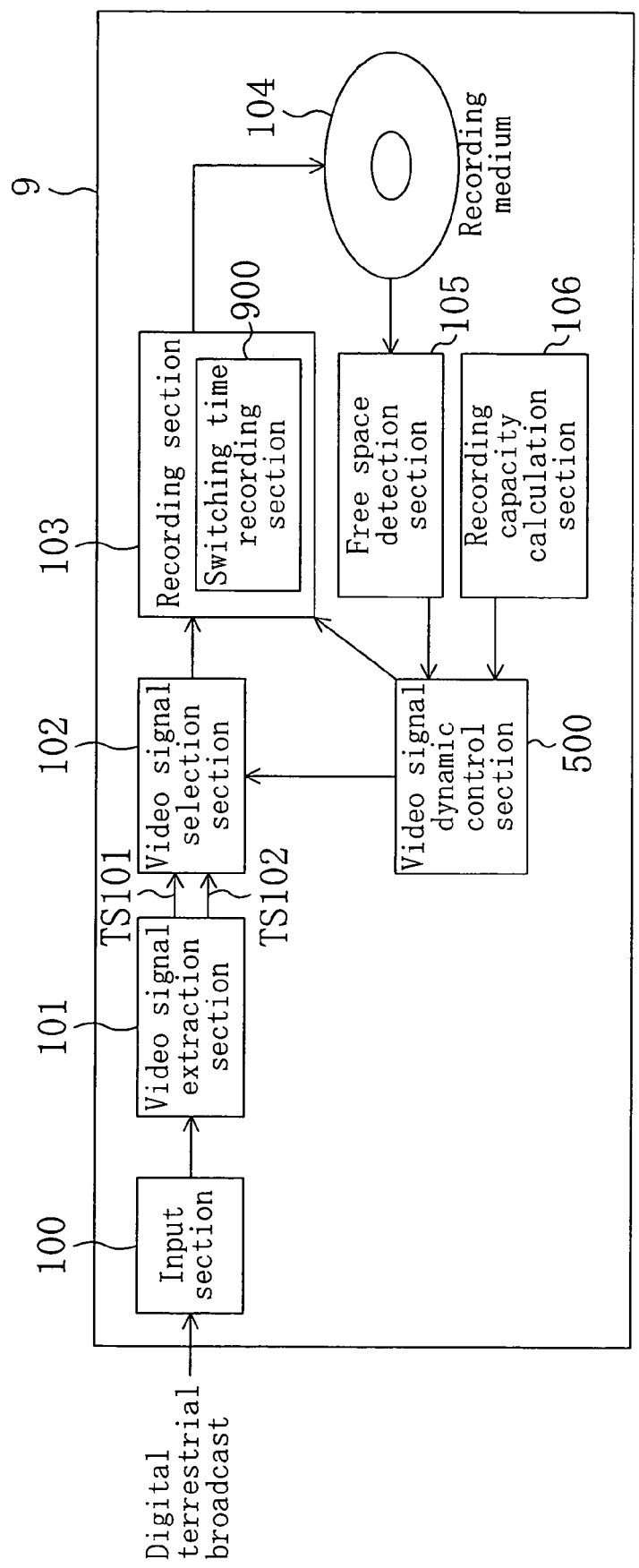
FIG. 31 is a block diagram showing an entire structure of a video signal recording apparatus according to embodiment 9 of the present invention.

FIG. 31 shows the entire structure of a video signal recording apparatus 9 according to embodiment 9 of the present invention. The video signal recording apparatus 9 includes a switching time recording section 900 in addition to the components of the video signal recording apparatus 5 of FIG. 13. The video signal dynamic control section 500 outputs a selection signal to the video signal selection section 102 and the switching time recording section 900. The selection signal indicates which of transport stream TS101 or transport stream TS102 is selected. The video signal selection section 102 selects transport stream TS101 or transport stream TS102 according to the selection signal from the video signal dynamic control section 500. The switching time recording section 900 refers to the selection signal output from the video signal dynamic control section 500 to record switching time information according to the selection signal. The switching time information indicates the time when the video signal selection section 102 switches transport stream TS101 and transport stream TS102 (the time interval between the time point when the video signal selection section 102 selects any one of transport stream TS101 and transport stream TS102 and the time point when the video signal selection section 102 switches the transport stream to the other one, and the type of the transport stream selected during the time interval by the video signal selection section 102).

Figure 32:
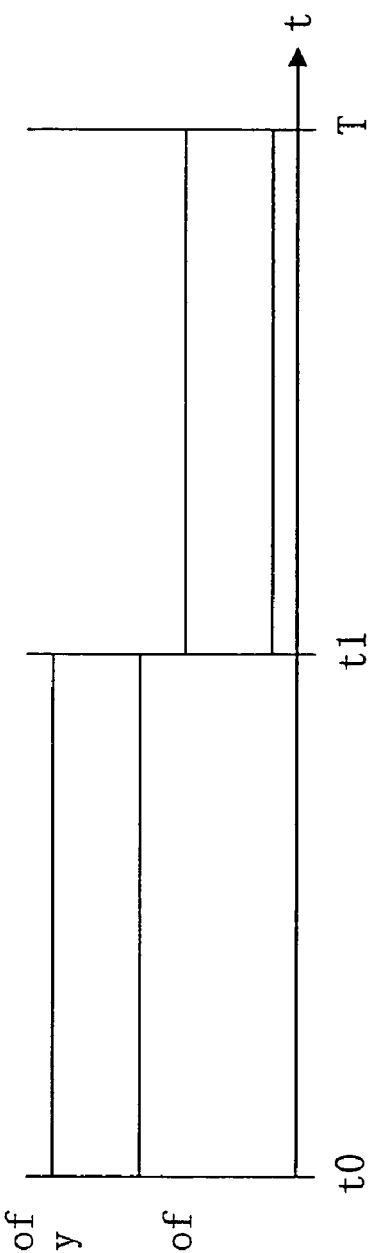
FIG. 32 is a timing chart illustrating an operation of the video signal recording apparatus shown in FIG. 31.

Hereinafter, the operation of the video signal recording apparatus 9 shown in FIG. 31 is described with reference to the timing chart of FIG. 32 and the switching time information of FIG. 33.

At the start of a program (t0), the video signal selection section 102 selects transport stream TS101, and the recording section 103 records transport stream TS101 selected by the video signal selection section 102 on the recording medium 104.

At time t1, the video signal dynamic control section 500 determines that the free space detected by the free space detection section 105 is smaller than the recording capacity calculated by the recording capacity calculation section 106 to switch the selection signal which is to be output to the video signal selection section 102 from "selection of transport stream TS101" to "selection of transport stream TS102". The video signal selection section 102 selects transport stream TS102 in place of currently-selected transport stream TS101 according to the selection signal from the video signal dynamic control section 500. The recording section 103 records transport stream TS102 selected by the video signal selection section 102 on the recording medium 104. Since the selection signal from the video signal dynamic control section 500 has been switched from "selection of transport stream TS101" to "selection of transport stream TS102", the switching time recording section 900 records the switching time information on the recording medium 104. The switching time information indicates that the video program was recorded based on MPEG2 which is the encoding method of transport stream TS101 during a period from time t0 to time t1 as shown in FIG. 33.

At time T, the video program ends. At this point in time, the switching time recording section 900 records on the recording medium 104 the switching time information indicating that the video program was recorded based on H.264 (or MPEG4) which is which is the encoding method of transport stream TS102 during a period from time t1 to program end time T as shown in FIG. 33.

Embodiment 10

Figures 33, 34:
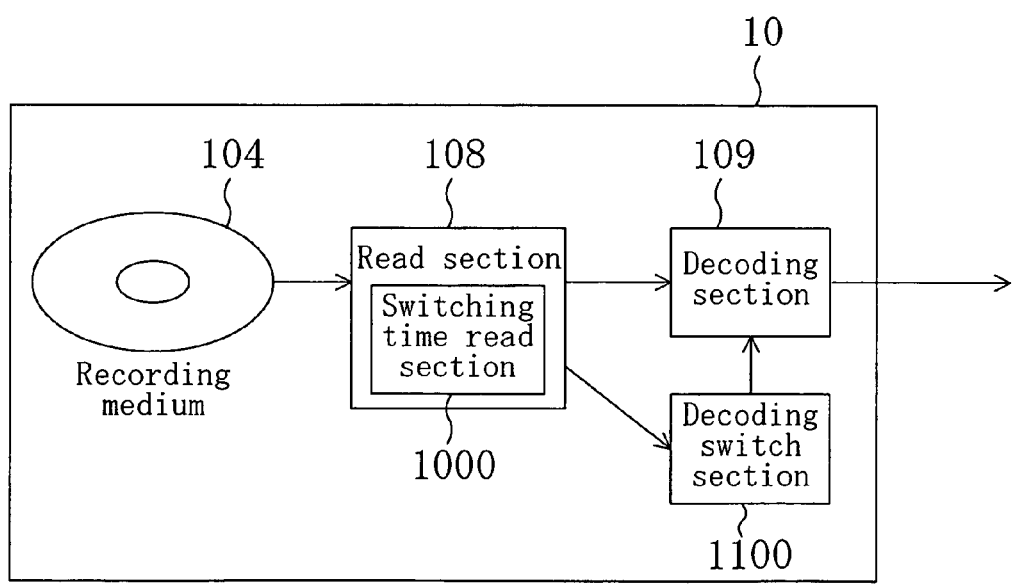
FIG. 33 shows switching time information.
FIG. 34 shows an entire structure of a video signal reproduction apparatus according to embodiment 10 of the present invention.

FIG. 34 shows the entire structure of a video signal reproduction apparatus 10 according to embodiment 10 of the present invention. The video signal reproduction apparatus 10 includes a read section 108, a decoding section 109, a switching time read section 1000 and a decoding switch section 1100. The recording medium 104 contains a transport stream and switching time information, which are recorded thereon by the video signal recording apparatus 9 of FIG. 31. The read section 108 reads the transport stream recorded on the recording medium 104. The switching time read section 1000 reads the switching time information recorded on the recording medium 104. The decoding switch section 1100 switches the decoding method used in the decoding section 109 according to the switching time information read by the switching time read section 1000. The decoding section 109 decodes the transport stream read by the read section 108 using the decoding method selected by the decoding switch section from MPEG2 and H.264 (or MPEG4).

Hereinafter, the operation of the video signal reproduction apparatus 10 shown in FIG. 34 is described. It is assumed herein that the recording medium 104 contains a transport stream and switching time information of FIG. 33, which are recorded thereon by the video signal recording apparatus 9 of FIG. 31.

In the first place, the switching time read section 1000 reads the switching time information recorded on the recording medium 104.

Since the switching time information read by the switching time read section 1000 indicates that a video program was recorded based on MPEG2 which is the encoding method of transport stream TS101 during a period from time t0 to time t1 (see FIG. 33), the decoding switch section 1100 switches the decoding method used in the decoding section 109 to MPEG2.

Then, the read section 108 reads the transport stream recorded on the recording medium 104.

Since the decoding method is switched by the decoding switch section 1100 to MPEG2, the decoding section 109 decodes the transport stream read by the read section 108 based on MPEG2.

At time t1, the switching time information read by the switching time read section 1000 indicates that a video program was recorded based on H.264 which is the encoding method of transport stream TS102 during a period from time t1 to program end time T (see FIG. 33). Therefore, the decoding switch section 1100 switches the decoding method used in the decoding section 109 to H.264.

Since the decoding method is switched by the decoding switch section 1100 to H.264, the decoding section 109 decodes the transport stream read by the read section 108 based on H.264.

In this way, transport stream TS101 and transport stream TS102 recorded on the recording medium 104 are decoded based on appropriate decoding methods.

As described above, a program recorded while the stream of a broadcast for stationary receivers and the stream of a broadcast for mobile receivers are switched in the middle of the program is reproduced.

In embodiments 9 and 10, the switching time information are the recording time and the encoding method. However, the byte size of a recoded transport stream may be used instead of the recording time.

It should be noted that in the above embodiments, the encoded video signals of MPEG2 and H.264 are employed as examples in the above description, but applications of the present invention are not limited to these signals. For example, the present invention may be applied to two or more encoded signals of different compression ratios other than MPEG2 and H.264.

As described above, according to a signal recording apparatus and signal recording method of the present invention, if the free space is smaller than the recording capacity, a program is recorded on a recording medium in the form of a second encoded signal whose compression ratio is higher than that of a first encoded signal. With such a structure, the program is entirely recorded on the recording medium even when the free space is insufficient. Thus, the present invention is useful as a signal recording apparatus or method for recording video/audio data on a recording medium.

What is claimed is:

1. A signal recording apparatus for recording an encoded signal on a recording medium, comprising:
    a free space detection section for detecting a free space of the recording medium;
    a recording capacity calculation section for calculating a recording capacity necessary for recording a program in the form of a first encoded signal on the recording medium;
    a signal control section for comparing the free space detected by the free space detection section and the recording capacity calculated by the recording capacity calculation section;
    a signal selection section for selecting at least one of the first encoded signal and a second encoded signal according to a result of the comparison by the signal control section; and
    a recording section for recording the encoded signal selected by the signal selection section on the recording medium,
    wherein the first encoded signal is obtained by compressively encoding the program at a first compression ratio, and
    the second encoded signal is obtained by compressively encoding the program at a second compression ratio which is higher than the first compression ratio.

2. The signal recording apparatus of claim 1, further comprising a signal separation section for separating the first encoded signal and the second encoded signal from a multiplex signal including the first encoded signal and the second encoded signal, wherein
    the signal selection section selects at least one of the first encoded signal and the second encoded signal separated by the signal separation section according to the result of the comparison by the signal control section.

3. The signal recording apparatus of claim 1, wherein:
    the signal selection section extracts at least one of the first encoded signal and the second encoded signal from a multiplex signal including the first encoded signal and the second encoded signal; and
    the recording section records the encoded signal extracted by the signal selection section on the recording medium.

4. The signal recording apparatus of claim 1, wherein:
    the first encoded signal is a signal compressively encoded based on MPEG2; and the second encoded signal is a signal compressively encoded based on MPEG4 or H.264.

5. The signal recording apparatus of claim 1, wherein:
    the first encoded signal is a signal directed to stationary receivers which uses 12 segments of a digital terrestrial broadcast; and
    the second encoded signal is a signal directed to mobile receivers which uses 1 segment of the digital terrestrial broadcast.

6. The signal recording apparatus of claim 1, wherein:
    the recording capacity calculation section calculates a recording capacity necessary for recording a specific program of a given priority in the form of the first encoded signal on the recording medium; and
    the signal selection section selects the first encoded signal for a program whose priority is higher than a predetermined value and selects the second encoded signal for a program whose priority is equal to or lower than the predetermined value according to the result of the comparison by the signal control section.

7. The signal recording apparatus of claim 6, wherein:
    the recording capacity calculation section calculates a recording capacity necessary for recording a program whose priority is higher than the predetermined value in the form of the first encoded signal and a program whose priority is equal to or lower than the predetermined value in the form of the second encoded signal; and
    when the signal control section determines that the free space is equal to or larger than the recording capacity, the signal selection section selects the first encoded signal for the program whose priority is higher than the predetermined value and the second encoded signal for the program whose priority is equal to or lower than the predetermined value; and
    the apparatus further comprises a priority setting section for changing the predetermined value when the signal control section determines that the free space is smaller than the recording capacity.

8. The signal recording apparatus of claim 1, further comprising an extended time acquisition section for acquiring an extended time of the program, wherein the recording capacity calculation section calculates a recording capacity necessary for recording the program in the form of the first encoded signal in consideration of the extended time acquired by the extended time acquisition section.

9. The signal recording apparatus of claim 1, further comprising a display section for displaying which of the first encoded signal and the second encoded signal is selected by the signal selection section for each program.

10. The signal recording apparatus of claim 1, wherein:
    the free space detection section, the recording capacity calculation section and the signal control section operate in parallel with the process by the recording section for recording the encoded signal selected by the signal selection section on the recording medium; and
    the recording capacity calculation section calculates a recording capacity necessary for recording a part of a program to be recorded on the recording medium, which is not yet recorded on the recording medium, in the form of the first encoded signal on the recording medium.

11. The signal recording apparatus of claim 10, further comprising a commercial detection section for detecting a commercial in the program, wherein the signal selection section selects the first encoded signal or the second encoded signal according to the result of the comparison by the signal control section during a period when the commercial is detected by the commercial detection section.

12. The signal recording apparatus of claim 10, wherein:
    the signal selection section outputs a currently-unselected encoded signal in addition to a currently-selected encoded signal to the recording section for a predetermined time period according to the result of the comparison by the signal control section and then stops outputting the priorly-selected encoded signal while continuing to output the subsequently-selected encoded signal; and
    the recording section records the encoded signal output from the signal selection section on the recording medium.

13. The signal recording apparatus of claim 10, further comprising a GOP detection section for detecting a leading part of a GOP in a currently-unselected encoded signal, wherein
immediately after the leading part of the GOP has been detected by the GOP detection section, the signal selection section selects an encoded signal in which the leading part of the GOP has been detected according to the result of the comparison by the signal control section.

14. A signal recording method for recording an encoded signal on a recording medium, comprising:
a free space detection step of detecting a free space of the recording medium;
a recording capacity calculation step of calculating a recording capacity necessary for recording a program in the form of a first encoded signal on the recording medium;
a signal control step of comparing the free space detected by the free space detection step and the recording capacity calculated by the recording capacity calculation step;
a signal selection step of selecting at least one of the first encoded signal and a second encoded signal according to a result of the comparison at the signal control step; and
a recording step of recording the encoded signal selected by the signal selection step on the recording medium,
wherein the first encoded signal is obtained by compressively encoding the program at a first compression ratio, and
the second encoded signal is obtained by compressively encoding the program at a second compression ratio which is higher than the first compression ratio.

15. The signal recording method of claim 14, further comprising a signal separation step of separating the first encoded signal and the second encoded signal from a multiplex signal including the first encoded signal and the second encoded signal, wherein
the signal selection step includes the step of selecting at least one of the first encoded signal and the second encoded signal separated at the signal separation step according to the result of the comparison at the signal control step.

16. The signal recording method of claim 14, wherein:
the signal selection step includes the step of extracting at least one of the first encoded signal and the second encoded signal from a multiplex signal including the first encoded signal and the second encoded signal; and
the recording step includes the step of recording the encoded signal extracted at the signal selection step on the recording medium.

17. The signal recording method of claim 14, wherein:
the first encoded signal is a signal compressively encoded based on MPEG2; and
the second encoded signal is a signal compressively encoded based on MPEG4 or H.264.

18. The signal recording method of claim 14, wherein:
the first encoded signal is a signal directed to stationary receivers which uses 12 segments of a digital terrestrial broadcast; and
the second encoded signal is a signal directed to mobile receivers which uses 1 segment of the digital terrestrial broadcast.

19. The signal recording method of claim 14, wherein:
the recording capacity calculation step includes the step of calculating a recording capacity necessary for recording a specific program of a given priority in the form of the first encoded signal on the recording medium; and
the signal selection step includes the step of selecting the first encoded signal for a program whose priority is higher than a predetermined value and selecting the second encoded signal for a program whose priority is equal to or lower than the predetermined value according to the result of the comparison at the signal control step.

20. The signal recording method of claim 19, wherein:
the recording capacity calculation step includes the step of calculating a recording capacity necessary for recording a program whose priority is higher than the predetermined value in the form of the first encoded signal and a program whose priority is equal to or lower than the predetermined value in the form of the second encoded signal; and
when it is determined at the signal control step that the free space is equal to or larger than the recording capacity, the signal selection step includes the step of selecting the first encoded signal for the program whose priority is higher than the predetermined value and the second encoded signal for the program whose priority is equal to or lower than the predetermined value; and
the method further comprises a priority setting step of changing the predetermined value when it is determined at the signal control step that the free space is smaller than the recording capacity.

21. The signal recording method of claim 14, further comprising an extended time acquisition step of acquiring an extended time of the program, wherein
the recording capacity calculation step includes the step of calculating a recording capacity necessary for recording the program in the form of the first encoded signal in consideration of the extended time acquired at the extended time acquisition step.

22. The signal recording method of claim 14, further comprising a display step of displaying which of the first encoded signal and the second encoded signal is selected at the signal selection step for each program.

23. The signal recording method of claim 14, wherein:
the free space detection step, the recording capacity calculation step and the signal control step are performed in parallel with the process performed at the recording step of recording the encoded signal selected at the signal selection step on the recording medium; and
the recording capacity calculation step includes the step of calculating a recording capacity necessary for recording a part of a program to be recoded on the recording medium, which is not yet recorded on the recording medium, in the form of the first encoded signal on the recording medium.

24. The signal recording method of claim 23, further comprising a commercial detection step of detecting a commercial in the program, wherein
the signal selection step includes the step of selecting the first encoded signal or the second encoded signal according to the result of the comparison at the signal control step during a period when the commercial is detected at the commercial detection step.

25. The signal recording method of claim 23, wherein:
the signal selection step includes the step of outputting a currently-unselected encoded signal in addition to a currently-selected encoded signal for a predetermined time period according to the result of the comparison at the signal control step and then stopping outputting the priorly-selected encoded signal while continuing to output the subsequently-selected encoded signal; and the recording step includes the step of recording the encoded signal output at the signal selection step on the recording medium.

26. The signal recording method of claim 23, further comprising a GOP detection step of detecting a leading part of a GOP in a currently-unselected encoded signal, wherein
the signal selection step includes the step of selecting an encoded signal in which the leading part of the GOP has been detected according to the result of the comparison at the signal control step immediately after the leading part of the GOP has been detected at the GOP detection step.

27. The signal recording apparatus of claim 10, wherein the recording section further records a timing at which the signal selection section has switched selection of the encoded signal on the recording medium.

28. The signal recording method of claim 23, further comprising a switch recording step of recording a timing at which selection of the encoded signal is switched at the signal selection step on the recording medium.

29. The signal recording apparatus of claim 1, wherein the encoded signal is a video signal, an audio signal, or a data signal.

30. The signal recording method of claim 14, wherein the encoded signal is a video signal, an audio signal, or a data signal.

\* \* \* \* \*